US010809882B1

(12) United States Patent
Tsang et al.

(10) Patent No.: US 10,809,882 B1
(45) Date of Patent: Oct. 20, 2020

(54) INSERTION OF OBJECT IDENTIFIERS INTO A FEED OF OBJECT IDENTIFIERS

(71) Applicant: Pinterest, Inc., San Francisco, CA (US)

(72) Inventors: Audrey Y. Tsang, San Francisco, CA (US); Yanis Markin, San Francisco, CA (US); Vishwa Jayantilal Patel, San Francisco, CA (US); Ryan Wilson Probasco, San Leandro, CA (US); Keith Patrick Bormuth, San Francisco, CA (US); Timothy James Johnsen, San Francisco, CA (US)

(73) Assignee: Pinterest, Inc., San Francisco, CA (US)

( * ) Notice: Subject to any disclaimer, the term of this patent is extended or adjusted under 35 U.S.C. 154(b) by 131 days.

(21) Appl. No.: 15/640,152

(22) Filed: Jun. 30, 2017

(51) Int. Cl.
| | | |
|---|---|---|
| *G06F 17/20* | (2006.01) | |
| *G06F 3/0482* | (2013.01) | |
| *G06F 16/955* | (2019.01) | |
| *G06F 3/0485* | (2013.01) | |
| *G06F 16/338* | (2019.01) | |

(52) U.S. Cl.
CPC .......... *G06F 3/0482* (2013.01); *G06F 16/955* (2019.01); *G06F 3/0485* (2013.01); *G06F 16/338* (2019.01)

(58) Field of Classification Search
CPC .............................. G06F 3/0482; G06F 16/338
See application file for complete search history.

(56) References Cited

U.S. PATENT DOCUMENTS

| | | | | |
|---|---|---|---|---|
| 7,076,443 B1* | 7/2006 | Emens | ................... | G06Q 30/00 |
| | | | | 705/14.55 |
| 7,310,612 B2* | 12/2007 | McQueen, III | ........ | G06Q 30/02 |
| | | | | 705/26.61 |
| 7,647,300 B2* | 1/2010 | Nevill-Manning | ... | G06F 16/951 |
| | | | | 707/706 |
| 8,311,890 B2* | 11/2012 | Donovan | ............... | G06Q 30/02 |
| | | | | 705/14.73 |
| 8,918,465 B2* | 12/2014 | Barak | ................ | G06Q 30/0609 |
| | | | | 709/205 |
| 8,943,002 B2* | 1/2015 | Zelenko | ............. | G06Q 30/0211 |
| | | | | 706/12 |
| 9,047,340 B2* | 6/2015 | Jones | ................... | G06F 16/9535 |
| 9,116,944 B1* | 8/2015 | Emigh | .................... | G06F 16/24 |
| 9,350,598 B2* | 5/2016 | Barak | ..................... | H04L 51/32 |
| 9,563,336 B2* | 2/2017 | Barak | ..................... | G06F 9/451 |
| 9,582,579 B2* | 2/2017 | Barak | ................. | G06F 17/2235 |
| 9,672,196 B2* | 6/2017 | Shachar | ................. | G06Q 30/00 |

(Continued)

*Primary Examiner* — Mohammed H Zuberi
(74) *Attorney, Agent, or Firm* — Athorus, PLLC

(57) ABSTRACT

Disclosed are systems and methods for inserting or injecting additional object identifiers into a currently presented feed or presentation of object identifiers. For example, a user of a portable device may view a feed or set of object identifiers, such as images of objects, that is presented on the display of the portable device. As the user views the object identifiers, the user may interact with one or more of those object identifiers by selecting an interaction control associated with the object identifier to indicate an interest in the object identifier. In response to the interaction, rather than presenting a new set of object identifiers, the described implementations insert or inject additional object identifiers into the current feed or set of object identifiers so that the user can continue to view the current object identifiers as well as the additional object identifiers.

22 Claims, 16 Drawing Sheets

(56) References Cited

U.S. PATENT DOCUMENTS

| | | | | |
|---|---|---|---|---|
| 10,089,649 B1* | 10/2018 | Schafer | ............ | G06Q 30/0251 |
| 2009/0271723 A1* | 10/2009 | Matsushima | ......... | G06F 3/0482 |
| | | | | 715/769 |
| 2015/0199442 A1* | 7/2015 | Hahn | .................. | G06F 16/9535 |
| | | | | 707/751 |
| 2016/0041701 A1* | 2/2016 | Gao | ..................... | G06F 3/0482 |
| | | | | 715/825 |
| 2016/0041722 A1* | 2/2016 | Ren | .................... | G06F 3/04842 |
| | | | | 715/765 |
| 2016/0373396 A1* | 12/2016 | Sorg | ........................ | H04L 51/32 |

* cited by examiner

INSERTION OF OBJECT IDENTIFIERS INTO A FEED OF OBJECT IDENTIFIERS

BACKGROUND

People are increasingly interacting with computers and other electronic devices in new and interesting ways. With the increased processing capabilities, connectivity and location tracking, electronic devices have become widespread and used in many everyday activities. For example, people often use electronic devices to search for products, watch videos, listen to music, research, shop for both digital and physical products ("e-commerce"), and receive news, just to name a few. Other uses include communicating with social communities, friends and family, photography, and many others.

Objects are typically made available and people search for objects, based on information about the object for which they are searching. Key words that describe an object are often associated with the object and when people search using one or more of those key words the object may be returned as a result. While this provides a good foundation for searching for objects based on information about the object, it limits the ability for individuals to search for, share, and experience objects in other ways.

DETAILED DESCRIPTION

Figure 1A:
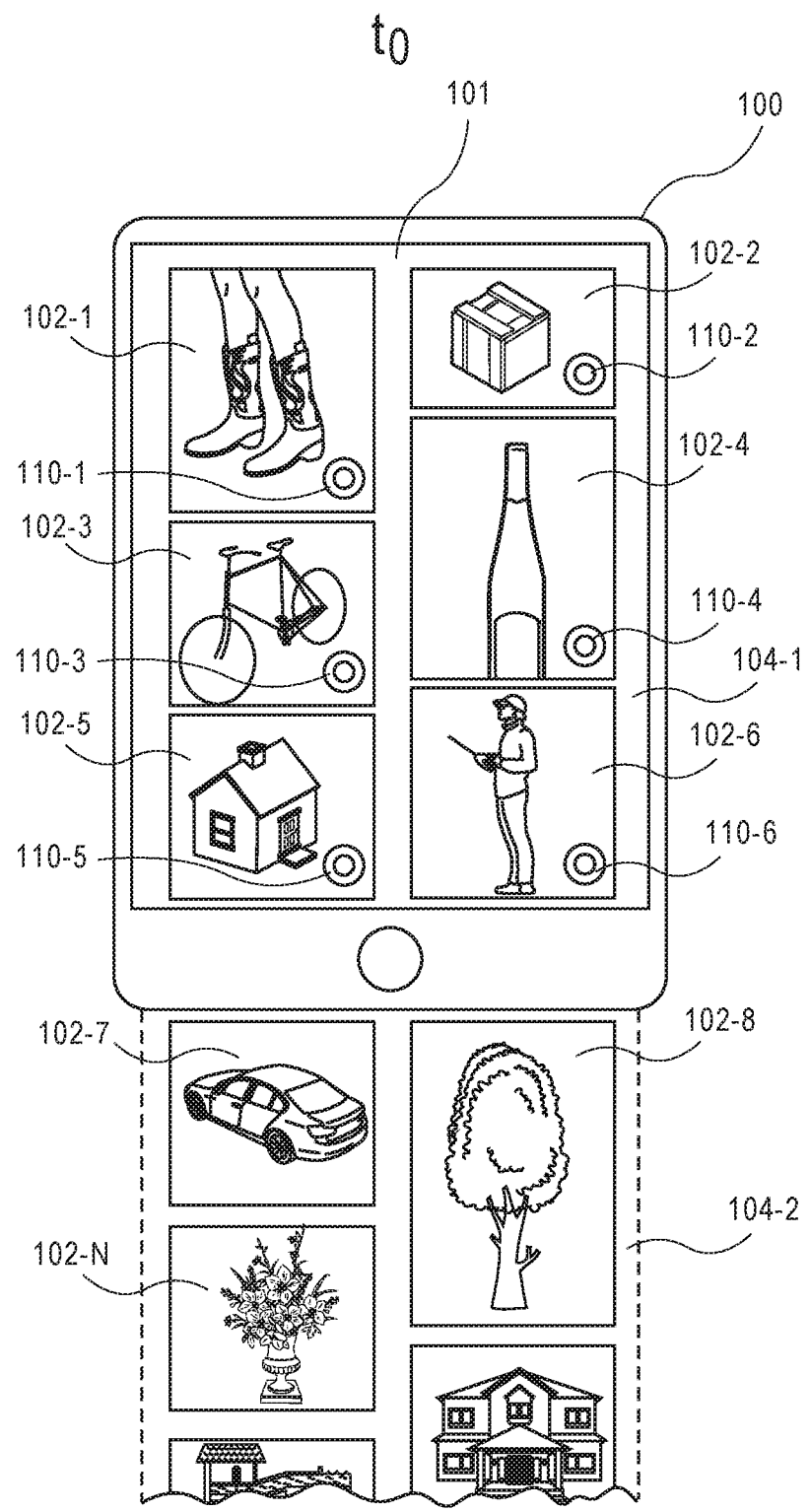
FIGS. 1A-1F are illustrations of object identifiers and interaction control identifiers, according to described implementations.

Disclosed are systems and methods for inserting or injecting additional object identifiers into a currently presented feed or presentation of object identifiers. For example, a user of a portable device may view a feed or set of object identifiers, such as images of objects, that is presented on the display of the portable device. As the user views the object identifiers, the user may interact with one or more of those object identifiers by selecting an interaction control associated with the object identifier to indicate an interest in the object identifier. In response to the interaction, rather than presenting a new set of object identifiers, the described implementations insert or inject additional object identifiers into the current feed or set of object identifiers so that the user can continue to view the current object identifiers as well as the additional object identifiers.

As discussed further below, in some implementations, an injection control may be associated with all or a portion of an object identifier. For example, an injection control corresponding to an object identifier may be assigned to a lower right quadrant or section of the presented object identifier. If the user provides an input, such as touch on a touch-based display, in the section of the object identifier associated with the injection control, the interaction will be interpreted as an indication that the user is interested in receiving additional object identifiers that are related to that object identifier. In some implementations, an injection control identifier may be presented in the area of object identifier corresponding to the section associated with the injection control to visually illustrate to the user the portion of the object identifier that may be selected to indicate an interest in the object identifier and to be presented with other, related object identifiers.

For purposes of discussion, an "object identifier," as used herein, is a collection of one or more items of information that identifies an object. The object identifier may include any combination of: a representation for the object (e.g., image), such as a graphical representation, audible representation, or other representation of the object; a context for the object as understood by the user; a description of the object provided by one or more users; static information about the object; supplemental information about the object; the set to which the object belongs (discussed below); the source of the object; any parent object identifier(s) from which the object identifier was created; and any identification of other similar object identifiers. As will be appreciated, additional or fewer items of information may be included in an object identifier.

The methods and systems described herein further enable users to manage, search for, share and discover objects by organizing object identifiers into "sets." For example, users may create one or more sets and object identifiers may be associated with those sets. Generally, a "set" is a collection of object identifiers. In one implementation, each set may include any number of object identifiers, including zero (a null set). An object identifier may be associated with one or many sets. In one implementation, an object identifier may only be associated with one set. In some implementations, object identifiers that are associated with the same set may be indicated as related object identifiers.

Like object identifiers, sets may have a context. A set may also include a category, such as travel, sports, animals, art, education, food and drink, etc. In some implementations, the presentation of the set and corresponding object identifiers may depend on the context and/or category associated with the set. For example, a set with a travel category may present information and/or object identifiers differently than a set with clothing as a category. To illustrate, a set with a travel category may present information on a map based on a location associated with each object identifier. In comparison, a set with clothing as a category may present object identifiers based on color.

Users can create object identifiers and add them to sets based on representations for objects provided or identified by the user or by adding existing object identifiers to their own set of object identifiers. An "object" may be anything that can be represented. For example, a user may create an object identifier for a television show, an image, a physical object, a sound, a web page, a location, a digital object, and the like. Object identifiers created with representations provided or identified by a user are considered parent object identifier relationships. Object identifiers created based on existing object identifiers are considered child object identifiers. An object identifier may have any number of parent and/or child object identifiers. As discussed further below, relationships (e.g., parent/child) between object identifiers may be maintained to allow users to discover other objects and to understand the source of the object represented by an object identifier. In some implementations, object identifiers may also be advertisements for products represented by the object identifier and/or an offer to sell the object represented by the object identifier.

In some implementations, when a user accesses a portable device and/or an application executing on the portable device the user may be presented with object identifiers that are determined to be of potential interest to the user. For example, a user profile may be maintained by an object management service that includes information about a user. The information maintained in the user profile may be used by the object management service to determine object identifiers that are likely to be of interest to the user and, when the user access the portable device, may present the object identifiers to the user. As discussed further below, any variety of information may be maintained in the user profile.

FIG. 1A illustrates a portable device 100 that is used to present object identifiers 102, in accordance with disclosed implementations. The portable device 100 may be any type of device that can be used to present object identifiers and receive interactions from users. For example, the portable device may be a laptop computer, desktop computer, tablet computer, cellular phone, electronic book reader device, wearable device, etc. Likewise, presentation may be visual, audible, haptic, or any combination thereof.

In this example, the object identifiers 102 are presented on a display 101 of the portable device 100. The object identifiers may be object identifiers that are determined to be of potential interest to the user that is interacting with the portable device 100. In other implementations, the object identifiers may be randomly selected, selected based on a user's prior viewing history, based on recommendations from other users, etc. Likewise, the object identifiers 102 may essentially be a continuous feed 104 of object identifiers and the user may scroll up or down on the display to view other object identifiers in the feed of object identifiers.

In the illustrated example, the feed 104 of object identifiers includes a visible feed section 104-1 that includes object identifiers 102-1, 102-2, 102-3, 102-4, 102-5, and 102-6 that are presented on the display 101 of the device and a lower feed section 104-2 that includes object identifiers 102-7, 102-8-102-N. As will be appreciated, additional or fewer object identifiers 102 may be included in the visible feed section 104-1 and presented by the portable device 100. Likewise, any number and/or type of object identifiers may be included in the lower feed section 104-2.

For purposes of this discussion, the object identifiers 102 are referred to herein as a first set of object identifiers that are presented or available for presentation by the portable device 100 and part of a continuous feed 104 of object identifiers.

As the user views the object identifiers, the user may interact with one or more of the object identifiers to indicate an interest in the object identifier. For example, each object identifier, or a section thereof, may be associated with an injection control. An injection control may be interacted with by a user to indicate interest in the object identifier. In some implementations, the injection control may be associated with the lower right corner or section of the object identifier 102. If the user interacts with the portion of the object identifier corresponding to the injection control, the object identifier management service will present to the user additional object identifiers that are related to that object identifier. In comparison, if the user interacts with other portions of the object identifier, the user may be presented with other information, such as a detailed view of the object identifier, annotations associated with the object identifier, etc. An interaction with an injection control may include, for example, a tap, swipe left, swipe right, swipe up, swipe down, double-tap, or any other type of interaction.

As illustrated in FIG. 1A, in some implementations, the location of an injection control may be visually presented to the user as an injection control identifier 110. In this example, injection control identifiers 110-1, 110-2, 110-3, 110-4, 110-5, and 110-6 are presented on the display 101 and correspond to the position of the injection controls associated with the presented object identifiers 102-1, 102-2, 102-3, 102-4, 102-5, and 102-6. The injection control identifiers 110 may be presented as any type of illustration, such as a circle, ring, squire, star, etc.

In some implementations, an injection control and injection control identifier may not be part of or otherwise included in an object identifier and may instead be associated with a presented portion or segment of the object identifier. As such, the presented injection control identifier 110 may be presented such that it does not appear to be part of the object identifier 102. For example, the injection control identifier 110 may be presented as an overlay or presented such that it appears to be above or otherwise separate from the respective object identifier 102.

As discussed further below, in some implementations, the injection control for an object identifier may only be activated and/or the injection control identifier may only be visually presented when the presented object identifiers remain stationary on the display 101 for a defined period of time. If the user is scrolling or otherwise altering the presentation of the object identifiers or moving the presented object identifiers with respect to the display 101, the object identifiers are not considered stationary. In comparison, if the object identifiers are presented on the display 101 using the same group of display pixels of the display 101, the object identifier is considered stationary during the time that same group of pixels are being used to present the object identifier.

For example, if the user scrolls through the feed of object identifiers and stops scrolling such that object identifiers 102-1, 102-2, 102-3, 102-4, 102-5, and 102-6 are presented on the display 101 in a stationary manner for a defined period of time (e.g., two seconds), the respective injection control for each object identifier may be activated so that a user can interact with the injection control and receive additional object identifiers related to an interacted with object identifier. Likewise, the injection control identifiers 110 may be visually presented on the display 101 after the object identifiers 102 have been presented in a stationary manner on the display 101 for the defined period of time.

While the above example describes activating the injection controls after the object identifiers are presented stationary for a defined period of time and presenting the respective injection control identifiers after the defined period of time, in other implementations, the injection controls may always be active for each object identifier and the injection control identifiers may only be visually presented after the object identifiers have been presented and stationary for the defined period of time. In still other examples, the injection control may be active for each object identifier and the injection control identifiers presented any time the object identifier is presented on the display, without waiting for the object identifiers to be stationary on the display for a defined period of time. In still another example, the injection control identifier may always be presented but the injection control may only be activated when the object identifiers are stationary, or after the object identifiers have been stationary for a defined period of time. In still other implementations, the injection control and/or the injection control identifiers may be activated and/or presented based on a speed at which the object identifiers are moving across the display 101 of the portable device 100.

Figure 1B:
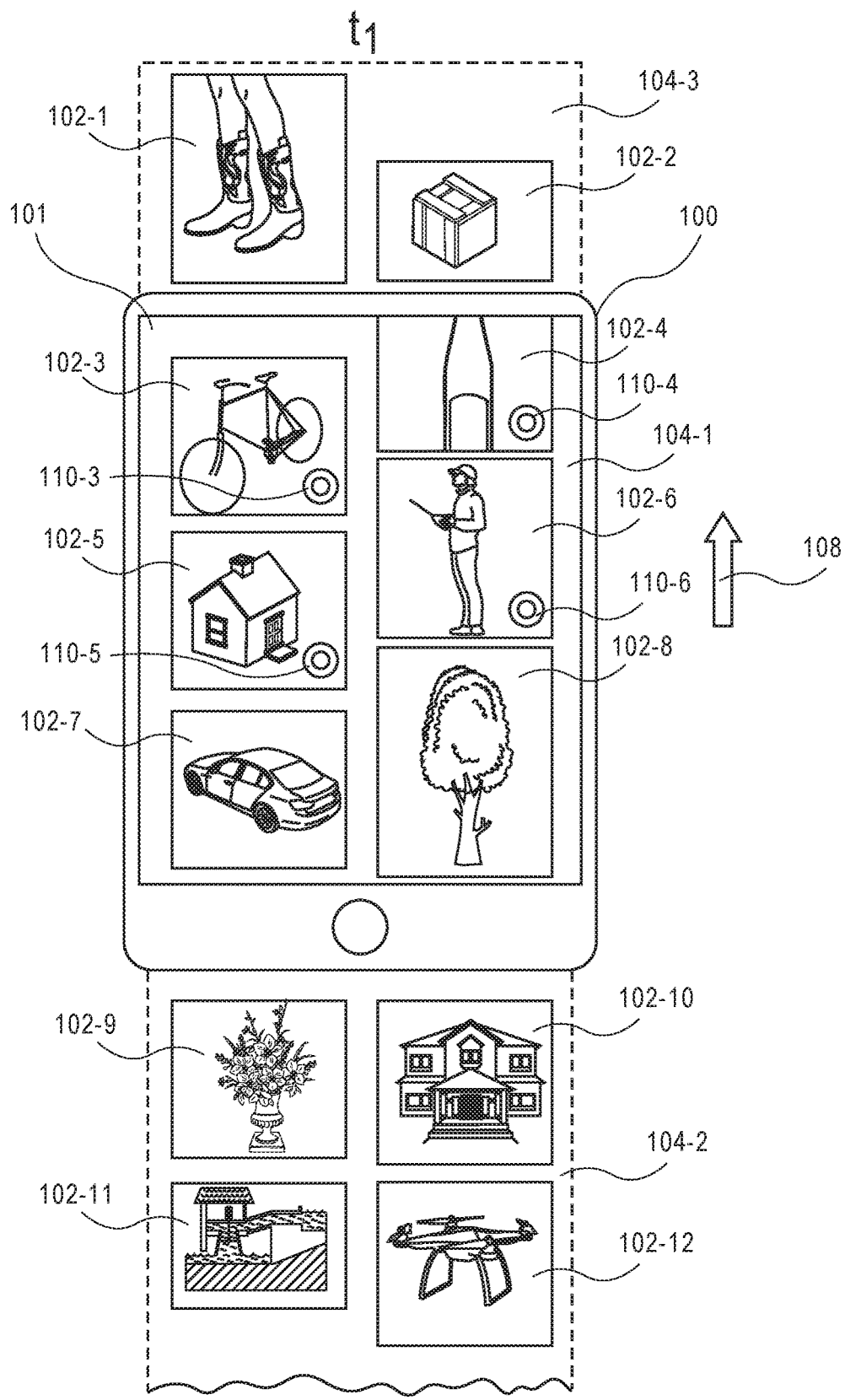

Referring to FIG. 1B, which continues the example from FIG. 1A, as the user scrolls through the object identifiers 102, as illustrated by scroll arrow 108, some of the object identifiers 102-1, 102-2 move beyond the display 101 of the portable device to the upper feed section 104-3 and other object identifiers, such as object identifiers 102-7, 102-8 move into the visible feed section 104-1 on the display of the portable device 100. Likewise, other object identifiers 102-9, 102-10, 102-11, 102-12, etc. remain in the lower feed section 104-2 and are not yet presented on the display 101 of the portable device 100.

In this example, the object identifiers 102-3, 102-4, 102-5, 102-6 for which the injection control identifiers 110-3, 110-4, 110-5, and 110-6 are already activated remain presented as the object identifiers are visually scrolled on the display. In comparison, as object identifiers 102-7 and 102-8 of the feed of object identifiers move into the visible feed section 104-1 as they are visually scrolled onto the display 101, the object identifiers may not be presented as the object identifiers are scrolling. Such a visual distinction aids the user in quickly determining which object identifiers on the display are newly presented and which object identifiers have been presented and stationary on the display previously. In this example, at time T1 the user may stop scrolling of the presented object identifiers such that object identifiers 102-3, 102-4, 102-5, 102-6 and corresponding injection control identifiers 110-3, 110-4, 110-5, and 110-6 remain presented on the display 101 and object identifiers 102-7 and 102-8 are now also presented on the display 101 of the portable device. Because object identifiers 102-7 and 102-8 were not previously presented and stationary on the display, there is no corresponding presentation of the injection control identifiers at time T1.

Figure 1C:
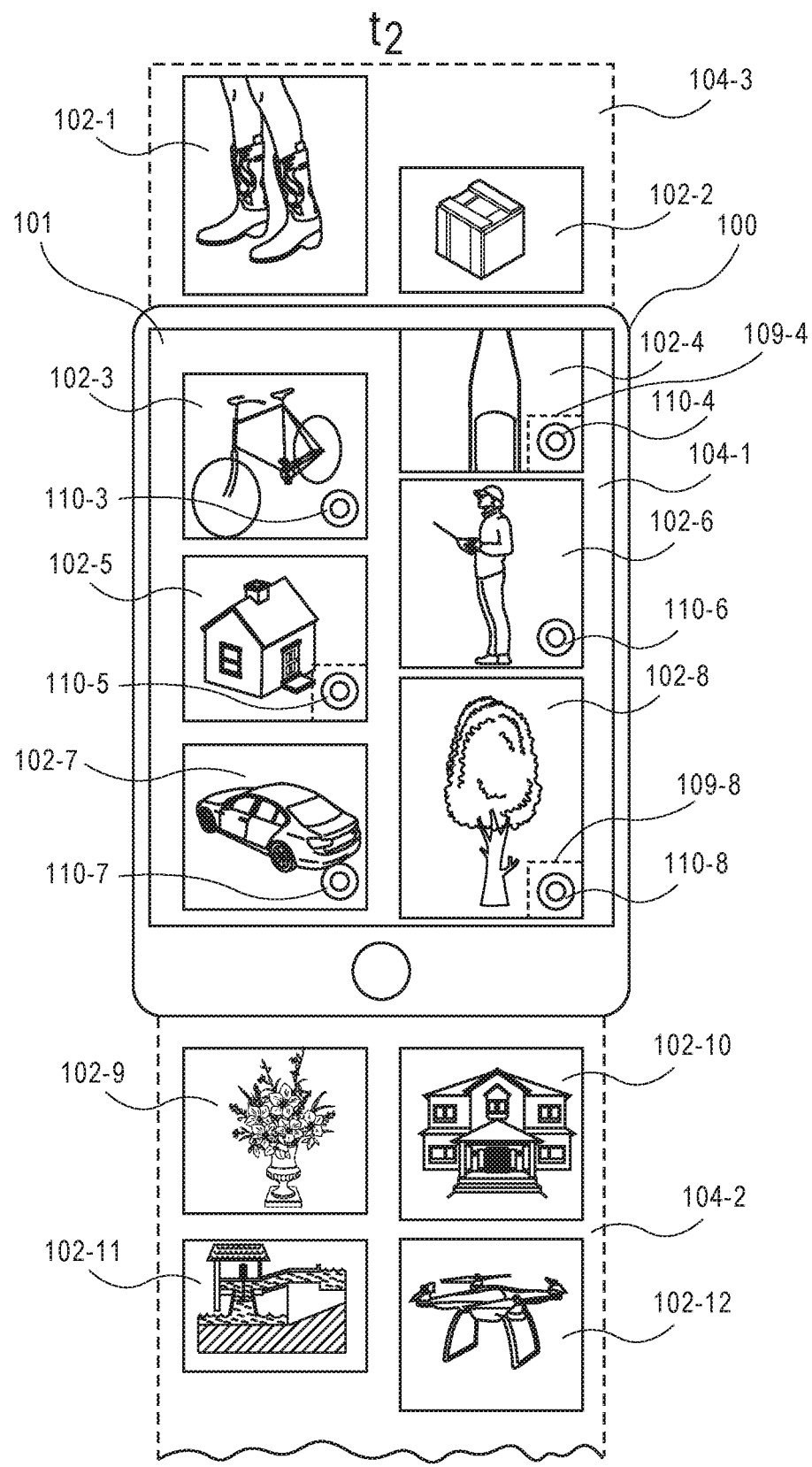

Referring now to FIG. 1C, after a defined period of time between T1 and T2 has elapsed and the object identifiers 102-3, 102-4, 102-5, 102-6, 102-7, and 102-8 have remained stationary with respect to the display, the injection control identifiers 110-7 and 110-8 are visually presented on the display 101 to indicate the position of the corresponding injection controls with respect to the object identifier.

As discussed above, an injection control may be associated with a segment of an object identifier. For example, the lower segment of object identifier 102-4 may be associated with an injection control 109-4 that may be interacted with by the user and the injection control identifier 110-4 may be presented to visually indicate the position corresponding to the injection control 109-4. Likewise, the lower segment of object identifier 102-8 may be associated with a second injection control 109-8 that may be interacted with by the user and the injection control identifier 110-4 may be presented to visually indicate the position corresponding to the second injection control 109-8.

While the illustrated example describes only the lower portion of an object identifier as corresponding to an injection control, in other implementations other portions and/or amounts of an object identifier may correspond to an injection control. For example, the upper corners, all corners, the lower half, upper half, the entire object identifier, or any other portion of the object identifier may correspond to the injection control for the object identifier.

Figure 1D:
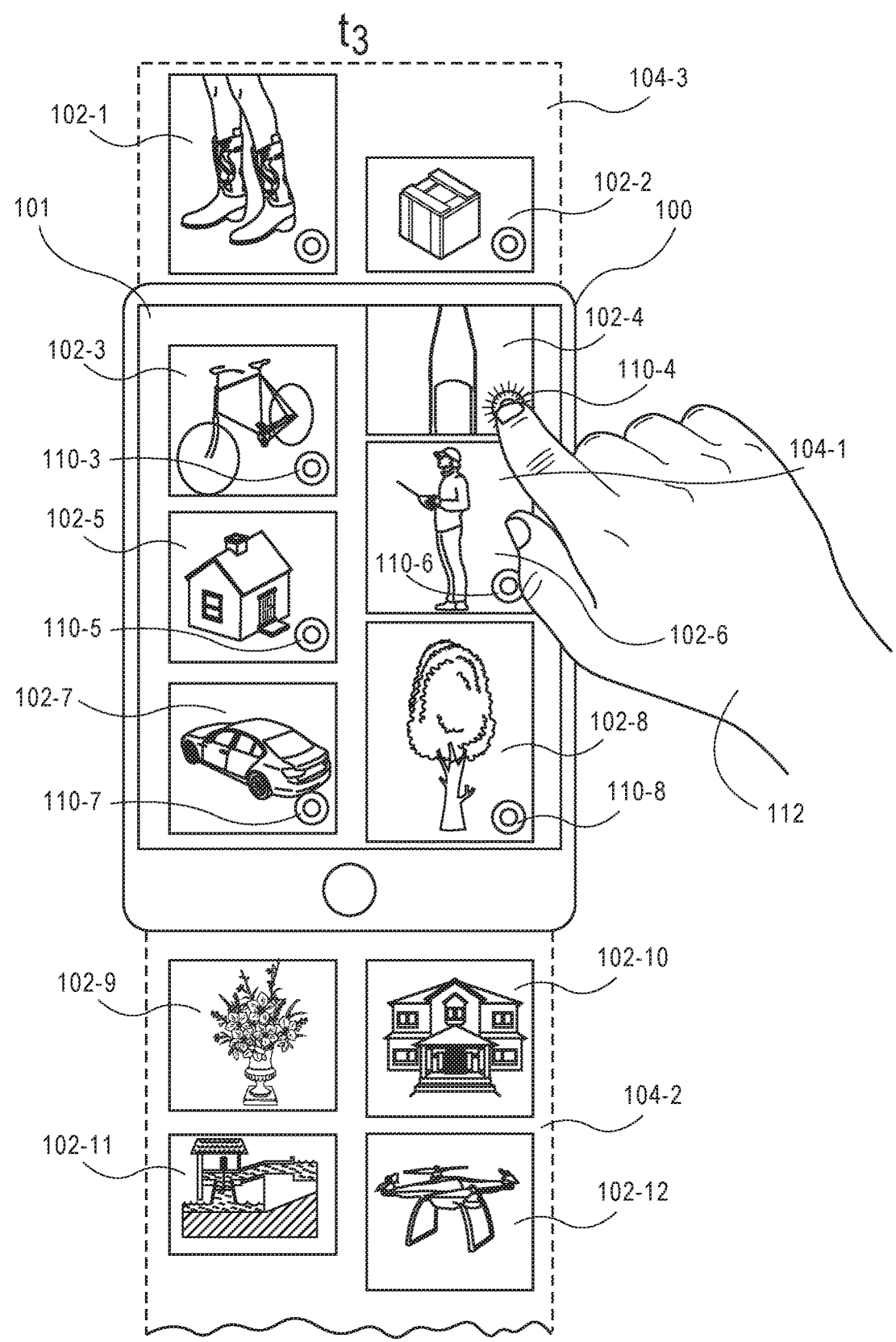

Continuing with the example and referring now to FIG. 1D, a user may interact with one or more of the injection controls. For example, the user may use their hand 112 to touch a portion of a touch based display 101 corresponding to an injection control, for example the portion of the display indicated by injection control identifier 110-4, and the touch of the display will constitute an interaction. The interaction may be any form of interaction or sequence of interactions. For example, the interaction may be a touch or tap, swipe, double-tap, tap and hold, etc. In some implementations, a defined gesture interaction, such as a swipe left or swipe right may be an interaction to invoke the injection control. In such an example, the injection control may correspond with the entire object identifier and be invoked by the user providing the defined gesture as the input for the object identifier. If the user provides a non-defined gesture on the object identifier a different action, such as a detail view of the object identifier, may be performed.

In still other implementations, other forms of input may be received as an interaction with an injection control. For example, the portable device may include one or more imaging elements, such as a camera, and the interaction may be an input detected based on gaze tracking and/or head tracking determined by processing images of the user interacting with the portable device 100. As still other examples, an interaction may be received using a mouse control, keyboard, audio input, motion input, etc.

Returning to FIG. 1D, in some implementations, the injection control identifier may be visually, haptically, and/or audibly interactive to provide feedback to the user to confirm receipt of the interaction. For example, if the user interacts with the injection control corresponding to the presented injection control identifier 110-4, the injection control identifier may flash, change sizes (e.g., expand or grow), change colors, etc., to provide a visual feedback to the user that the interaction has been received.

Upon receipt of an interaction with an injection control, additional object identifiers related to the object identifier corresponding to the selected injection control are inserted or injected into the presented object identifiers such that the additional object identifiers are included in the feed or set of object identifiers presented by the portable device 100 to the user. For example, if the user selects the injection control corresponding to object identifier 102-4 and illustrated by injection control identifier 110-4, additional object identifiers 105-1, 105-2, 105-3, 105-4, 105-5, and 105-6 are inserted into the feed of object identifiers 102-1, 102-2, 102-3, 102-4, 102-5, 102-6, 102-7, 102-8 such that they are presented as part of the feed 104 of object identifiers presented to the user. In the illustrated implementation, the additional object identifiers 105-1-105-6 are inserted between the object identifier 102-4 corresponding to the selected injection control and the adjacent object identifiers 102-3 and 102-6 such that the adjacent object identifiers 102-3 and 102-6, and each of the other object identifiers 102-5, 102-6, and 102-8 are moved further down in the feed of object identifiers. In other implementations, as discussed further below, some or all of the additional object identifiers are inserted or injected into other portions of the feed of object identifiers.

As discussed further below, the interaction with an injection control corresponding to an object identifier is received as an indication that the user desires to see additional object identifiers that are related to or otherwise similar to the object identifier corresponding to the interacted with injection control. Object identifiers may be considered related if they represent similar objects, are associated with the same set, have been selected by a user as related, relate to the same or similar topic, relate to the same or similar geographic area, etc. In the illustrated example, object identifier 102-4 relates to wine. Upon selection of the injection control corresponding to object identifier 102-4, additional object identifiers 105-1-105-6, which also relate to wine, are injected or inserted into the feed of object identifiers presented to the user.

The quantity of additional object identifiers injected into the feed may vary and may be fewer or more than the illustrated example of six additional object identifiers. Likewise, in some implementations, a user may select the injection control multiple times, each time resulting in the injection or insertion of more additional object identifiers that relate to the object identifier corresponding to the selected injection control. Likewise, as illustrated, an injection control may be associated with the injected and presented additional object identifiers and may be illustrated by a corresponding injection control identifier. For example, each of the additional object identifiers 105-1-105-6 may have corresponding injection controls and each of those injection controls may be illustrated by a respective injection control identifier 115-1, 115-2, 115-3, 115-4, and 115-5 for the object identifiers that are presented on the display 101 of the portable device. In some implementations, the injection control identifiers 115 may not be presented until the additional object identifiers have been presented and stationary for a defined period of time, which may be the same or different duration than the defined period of time before the injection controls 110 are presented, as discussed above. In other implementations, the injection control identifiers 115 may be presented at the same time the additional object identifiers 105 are presented.

In some implementations, in addition to injecting additional object identifiers into the feed of object identifiers adjacent the object identifier corresponding to the interacted with injection control, additional object identifiers may also be inserted into other portions of the feed. For example, an initial group of additional object identifiers 105-1-105-6 may be injected into the feed adjacent the object identifier 102-4 corresponding to the selected injection control and other additional object identifiers may be interspersed throughout other portions of the feed of object identifier so that they are presented to the user as the user continues to scroll through the feed of object identifiers.

Figure 1E:
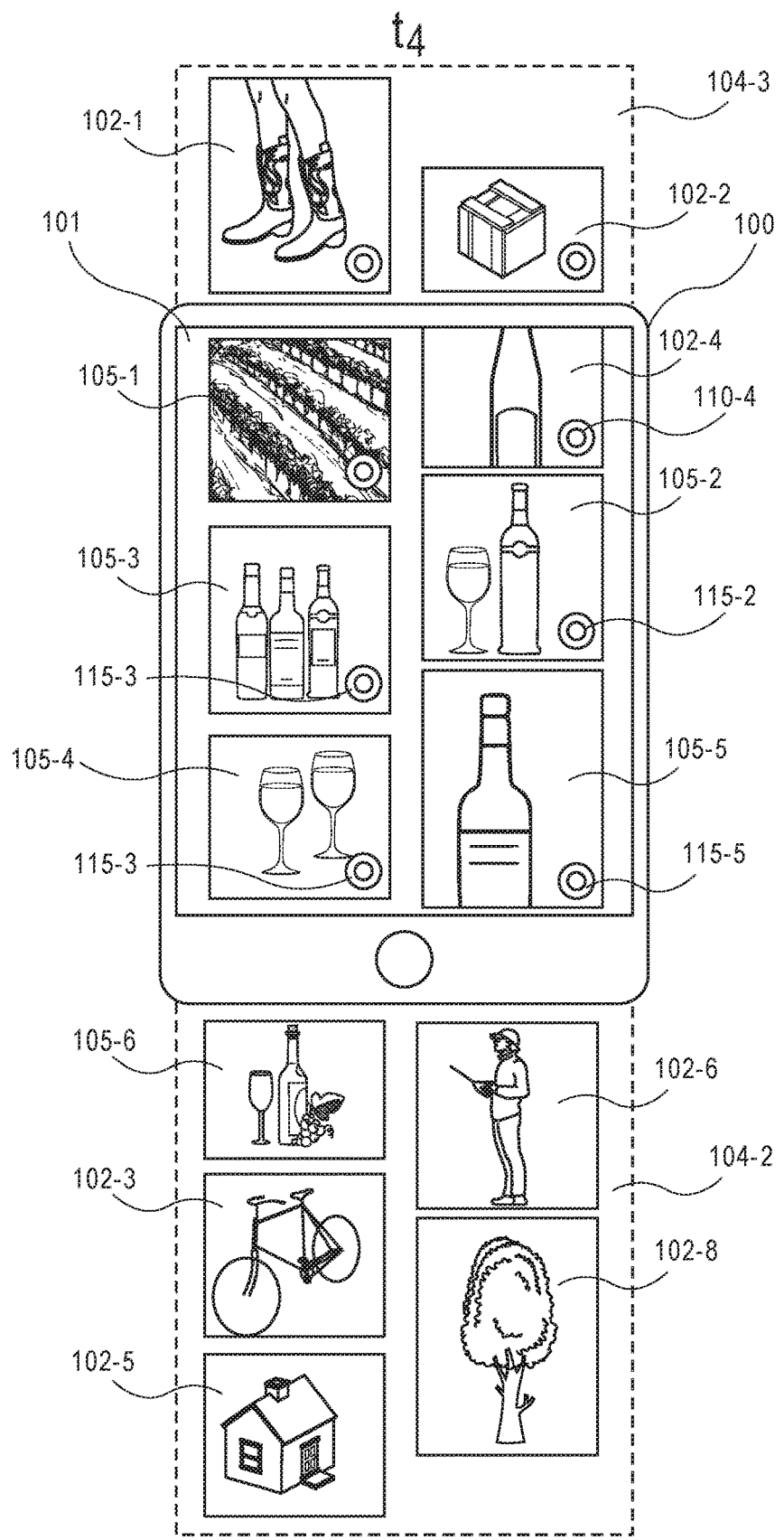
Figure 1F:
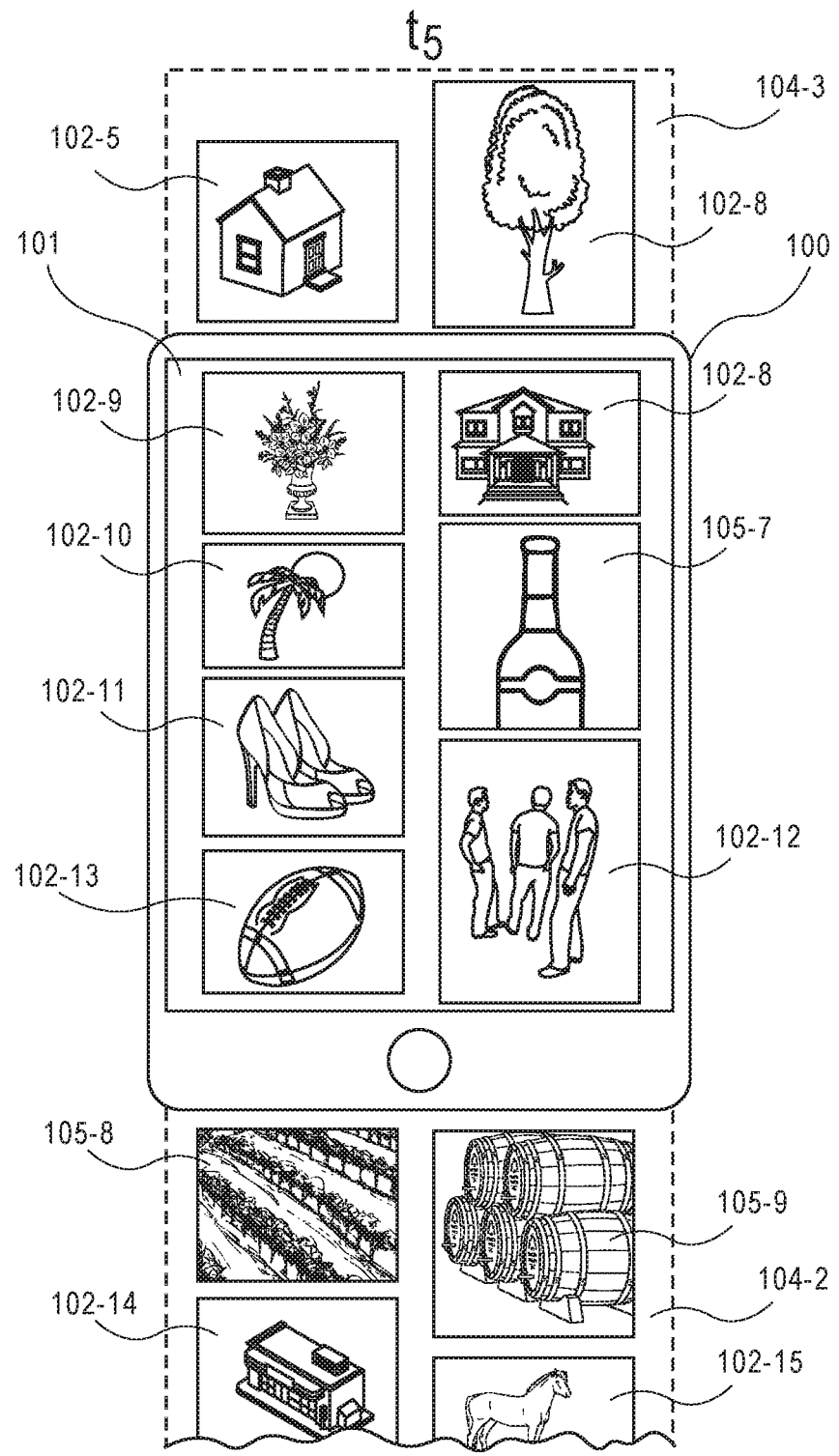

For example, referring to FIG. 1F, at time T5 the user has scrolled passed the additional object identifiers presented at time T4 (FIG. 1E) and is now presented with object identifiers 102-8, 102-9, 1-2-10, 102-11, 102-12, and 102-12 that were in the lower feed section of object identifiers. In addition, additional object identifiers 105-7, which relate to the object identifier 102-4 (FIG. 1E) corresponding to the selected injection control is intermixed and presented with the object identifiers 102. Intermixing of additional object identifiers 105 with object identifiers 102 that were originally part of the feed may be done each time an injection control is interacted with and may continue throughout the feed of object identifiers. For example, in the lower feed section 104-2 additional object identifiers 105-8 and 105-9 are intermixed between object identifiers 102-12, 102-13, 102-14, and 102-15.

The frequency of intermixing of additional object identifiers may vary based on the distance from the object identifier corresponding to the interacted with injection control, the number of times an interaction is received at the injection control, whether other injection controls corresponding to additional object identifiers are interacted with, etc.

Injecting or inserting additional object identifiers that relate to an object identifier corresponding to an interacted with injection control directly into a feed of currently viewed object identifiers provides a technical advantage over existing systems. Specifically, the user is presented with requested information (additional object identifiers) concurrently with the feed of object identifiers already presented. As a result, the user can continue to interact with the object identifiers in a normal manner, select one or more of the additional object identifiers, or scroll past those object identifiers and continue viewing the originally presented object identifiers. This is an improvement because all the information is presented concurrently and the user is not transitioned to different presentations to receive or view the additional object identifiers and does not have to navigate back to the prior presentation to continue viewing the originally presented object identifiers.

Figure 2A:
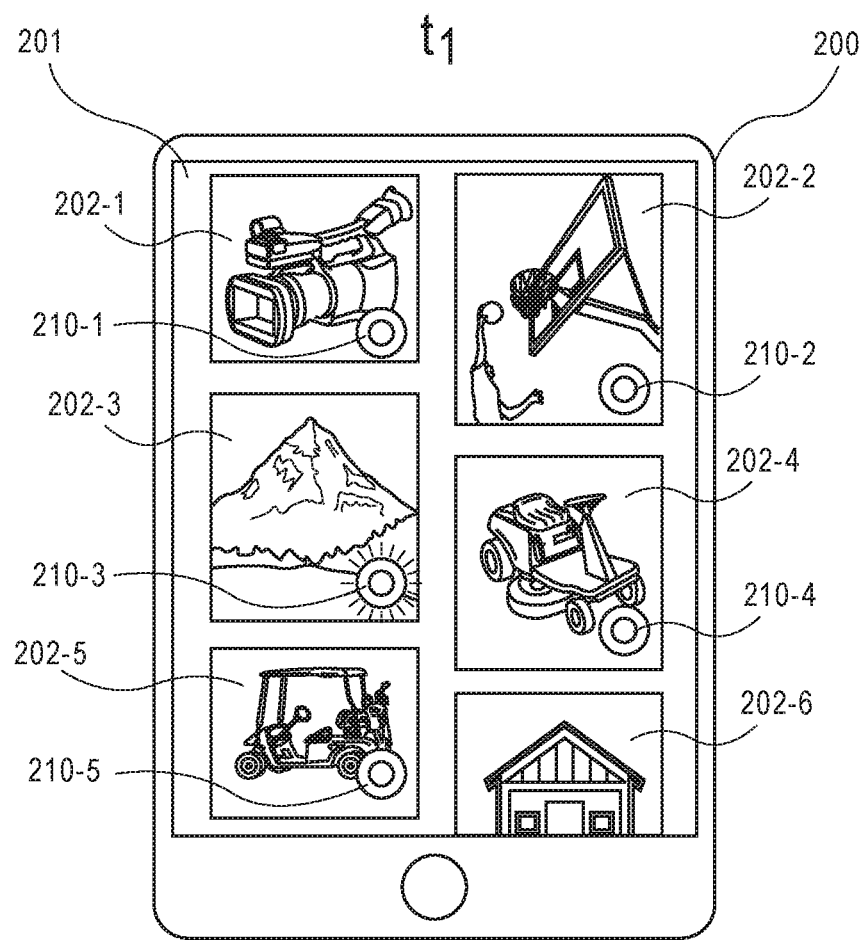
FIGS. 2A-2C are illustrations of object identifiers and interaction control identifiers, according to described implementations.
Figure 2B:
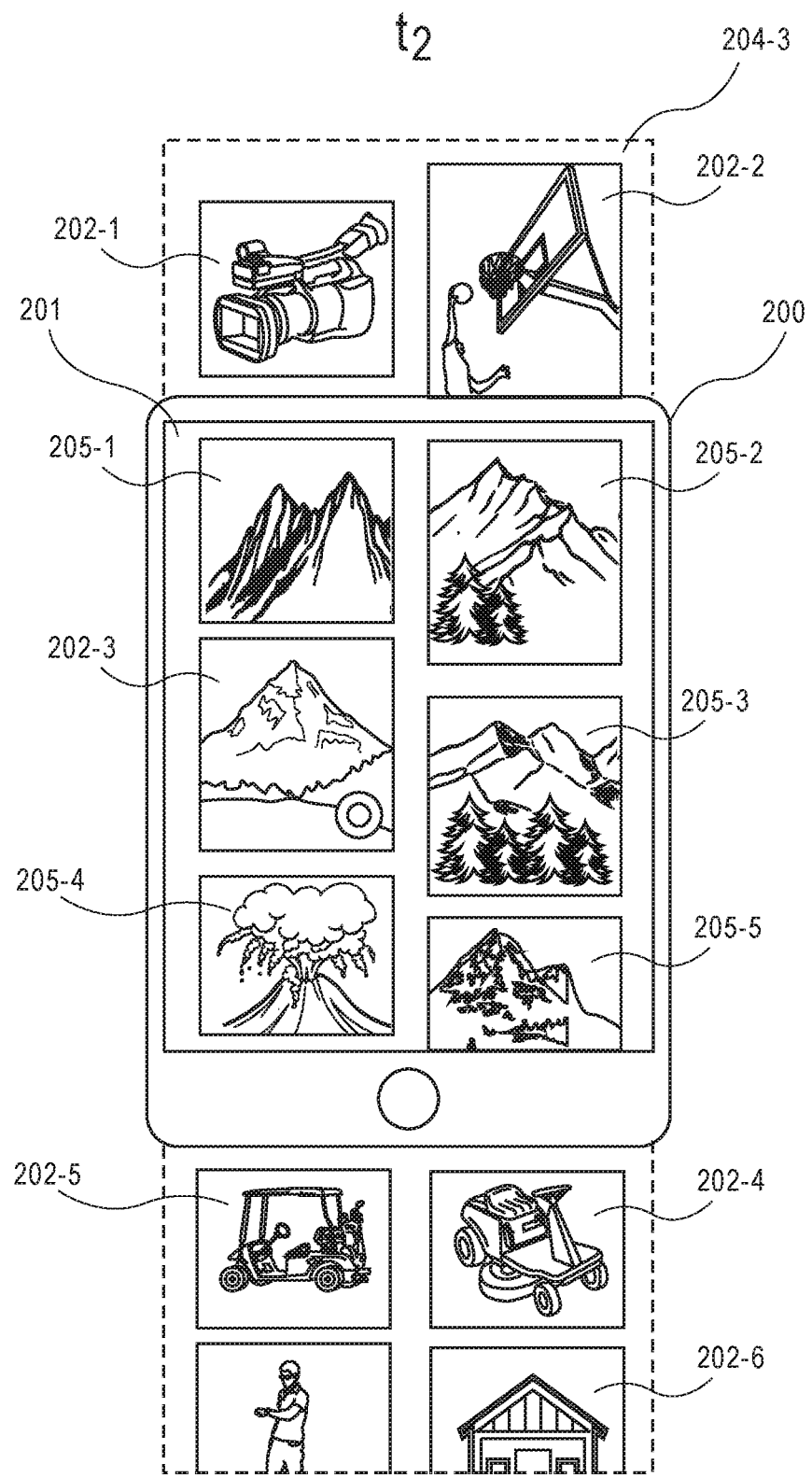
Figure 2C:
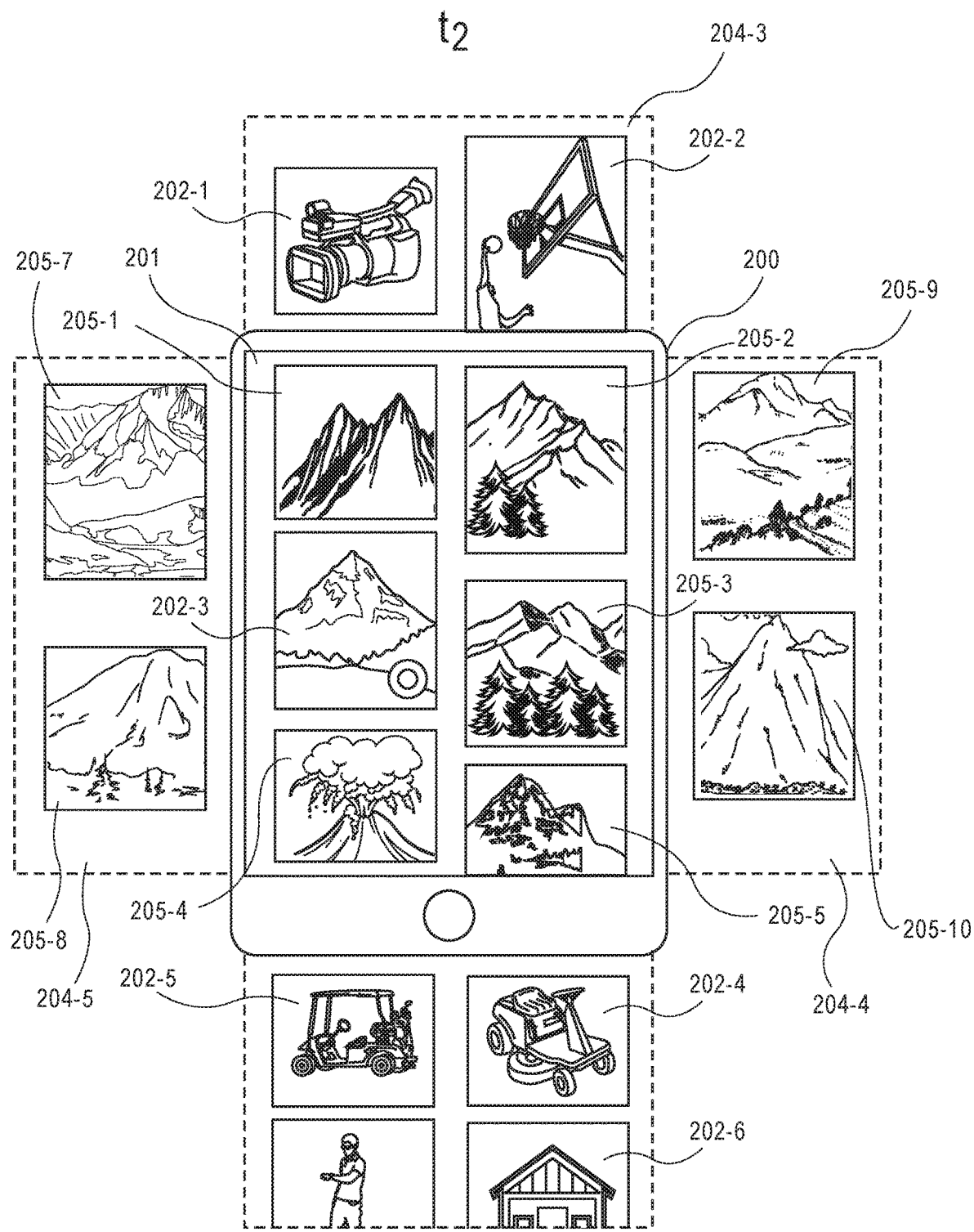

FIGS. 2A-2C provide alternative or additional examples of injecting additional object identifiers into a feed of presented object identifiers, according to described implementations. Referring first to FIG. 2A, the user is presented with object identifiers 202-1, 202-2, 202-3, 202-4, 202-5, and 202-6 that are part of a feed of object identifiers presented to the user via a display 201 of a portable device. The injection control identifiers 210-1, 210-2, 210-3, 210-4, and 210-5 indicating the position of the injection controls corresponding to each of the object identifiers presented on the display are also presented.

In this example, the user interacts with the injection control corresponding to object identifier 202-3, and the injection control identifier 210-3 provides a visual feedback to confirm receipt of the interaction. In response to the interaction, additional object identifiers that relate to object identifier 202-3 are presented around the object identifier 202-3 corresponding to the interacted with injection control. In this example, additional object identifiers 205-1 and 205-2 are injected into the feed and presented above object identifier 202-3. As illustrated, to inject additional object identifiers 205-1 and 205-2 into the feed above object identifier 202-3, object identifiers 202-1 and 202-2 are moved upward in the feed of object identifiers. In a similar manner, additional object identifiers 205-3, 205-4, and 205-5 are injected into the feed and presented below object identifier 202-3. To inject additional object identifiers into the feed of object identifiers, object identifiers 202-4, 202-5, and 202-6 are shifted downward in the feed.

As a result of shifting object identifiers and injecting additional object identifiers into the feed, the user can view and/or interact with the object identifiers 202-1-202-5 and/or the additional object identifiers 205-1-205-5 within the same feed of object identifiers. For example, the user can scroll up in the feed of object identifiers to be presented with object identifiers 202-1 and 202-2 or the user can scroll down in the feed to view object identifiers 202-4, 202-5, and 202-6. As discussed above, the user can interact with the same or other interaction controls to inject more additional object identifiers.

FIG. 2C illustrates another, alternative configuration for injecting object identifiers into a feed of object identifiers in response to a user interacting with injection control (FIG. 2A). In the example illustrated with respect to FIG. 2C, rather than injecting additional object identifiers above and below object identifier 202-3 that related to object identifier 202-3 such that interaction with the feed remains bidirectional (up or down), the additional object identifiers are injected and expand the feed of object identifiers horizontally. For example, the additional object identifiers 205-7 and 205-8 may be injected to the left of object identifier 202-3 and object identifiers 205-9 and 205-10 may be injected to the right of object identifier 202-3. In such an example, the user may move the feed of object identifiers in multiple different directions to view object identifiers and/or additional object identifiers. For example, the user may continue to scroll up or down to view the feed. Alternatively, the user may scroll right or left to view still more additional object identifiers that are related to object identifier 202-3.

As will be appreciated, any quantity and/or type of additional object identifiers may be injected into a feed of object identifiers and the injection may be at any position in the feed and/or may expand the feed in different directions, such as horizontally, diagonally, or in a third dimension into the feed of object identifiers.

Figure 3A:
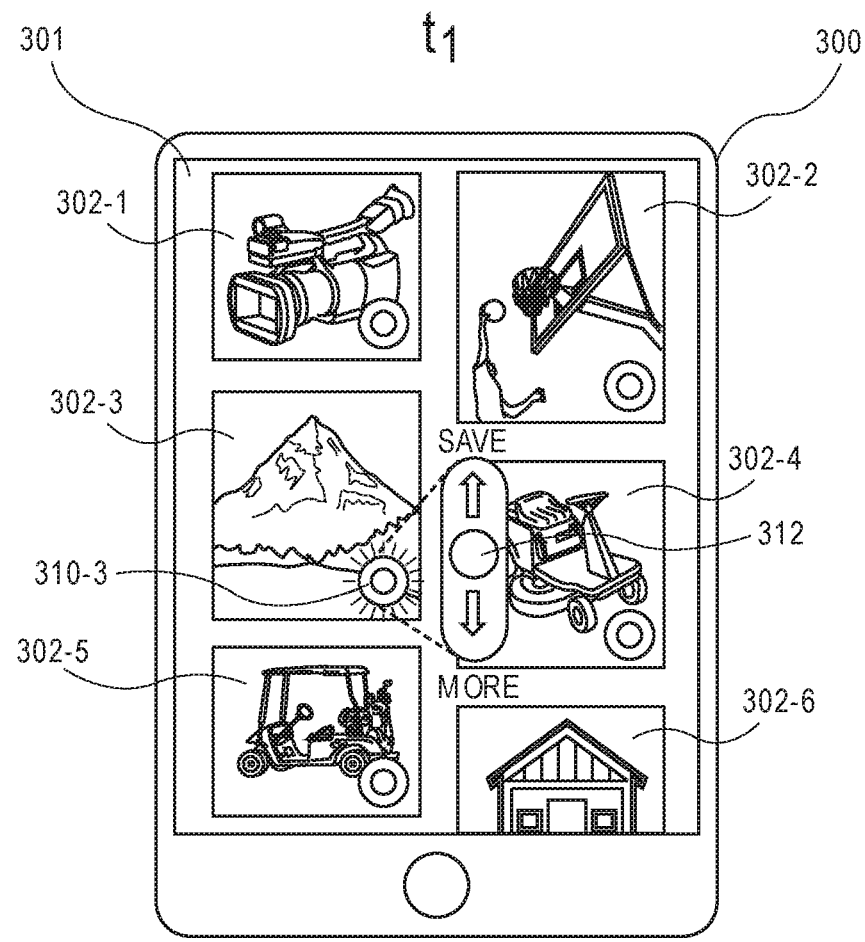
FIGS. 3A-3B are illustrations of object identifiers and injection control identifiers, according to described implementations.
Figure 3B:
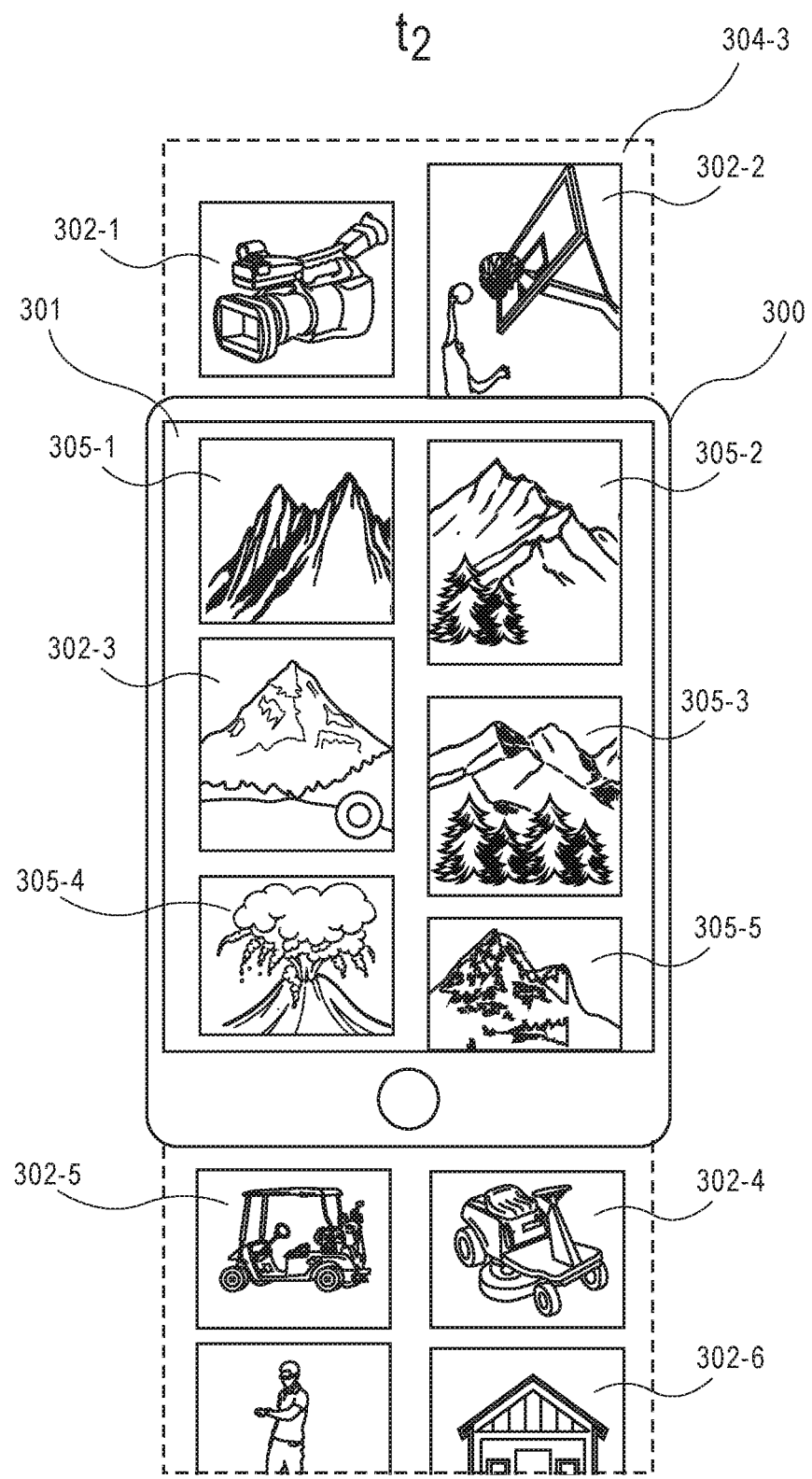

FIGS. 3A-3B illustrate another implementation of the injection control identifier, according to described implementations. In this example, object identifiers 302-1, 302-2, 302-3, 302-4, 302-5, and 302-6 are presented on a display 301 of a device 300. Upon selection of an injection control corresponding to object identifier 302-3, a visual feedback is provided by the corresponding injection control identifier 310-3 in the form of a slider bar 312 that provides the user with additional options for the object identifier corresponding to the selected injection control. The slider bar 312 provides the user additional objects that may be selected with respect to the object identifier 302-3 corresponding to the selected injection control. In this example, the user may move or slide the slider bar 312 upward to save the object identifier 302-3 or move the slider downward to be presented with additional object identifiers that are related to the object identifier 302-3. If the user selects to save the object identifier 302-3 by moving the slider bar 312 upward, the object identifier 302-3 may be associated with a set that is associated with the user and/or an instance of the object identifier 302-3 may be saved to a memory of the portable device 300. If the user selects to view "More" object identifiers by moving the slider bar 312 downward, additional object identifiers related to object identifier 302-3 are injected into the feed and presented on the display 301 of the portable device 300 as discussed above. For example, referring to FIG. 3B, in response to a user selecting "More," by moving the slider bar 312 downward, object identifiers 302-1 and 302-2 are moved upward in the feed 304, object identifiers 302-4, 302-5, and 302-6 are moved downward in the feed, and additional object identifiers 305-1, 305-2, 305-3, 305-4, and 305-5 are injected into the feed and presented on the display 301 of the device 300 as part of the feed and adjacent object identifier 302-3.

Figure 4:
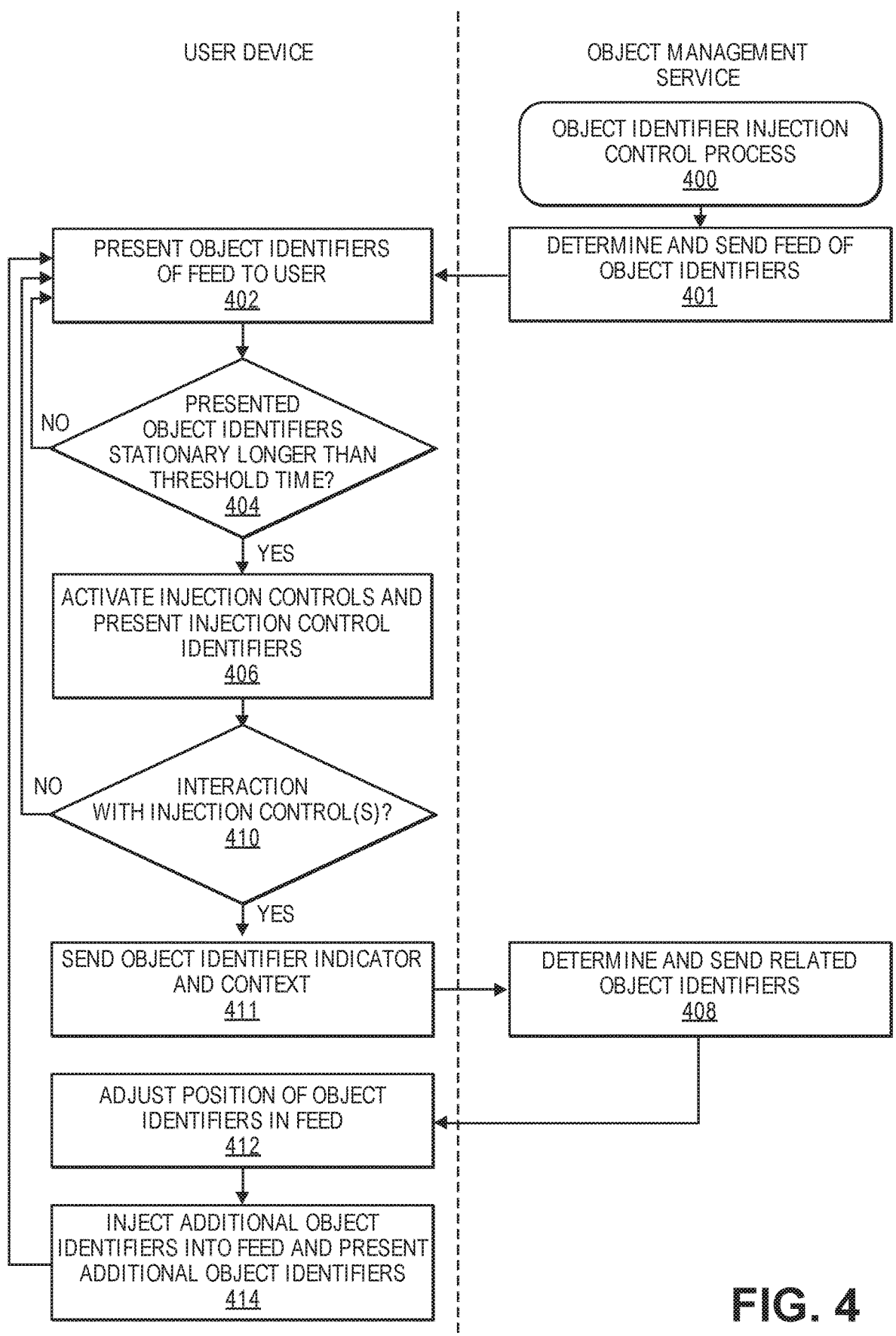
FIG. 4 illustrates an example object identifier injection control process, according to described implementations.

FIG. 4 illustrates a flow diagram of an example object identifier injection control process 400, according to described implementations. As illustrated, some portions of the example process 400 may be performed by a user device and other portions may be performed by the object management service executing on a remote computing device. In other implementations, different aspects of the example process may be performed, in whole or in part, by other computing components.

The example process 400 begins with the object management service determining a feed of object identifiers to present to a user and sending the determined object identifiers to a user device associated with the user, as in 401. The user device may be a device that requested the feed. Object identifiers to include in a feed of object identifiers may be determined based on, for example, a user profile corresponding to a user and/or a portable device that is to receive and present the feed of object identifiers, a location of the portable device, a time of day, a day of week, a season, the weather at the location of the portable device, etc. For example, a feed of object identifiers may include object identifiers related to topics identified in a user profile as of interest to a user. In other implementations, object identifiers for a feed of object identifiers may be randomly selected.

Upon determining a feed of object identifiers to present to a user and sending the feed of object identifiers to the user device, one or more of the object identifiers of the feed are presented to the user, as in 402. As discussed above, the feed of object identifiers may be a continuous feed of object identifiers that are presented to the user on a display of a portable device such that the user may interact with the feed of object identifiers to view different object identifiers included in the feed. For example, the user may scroll up or down in the feed to view other object identifiers included in the feed.

As the object identifiers of the feed of object identifiers are presented, a determination is made by the user device as to whether the presented object identifiers have been at a stationary position on the display for a defined period of time, also referred to as a threshold time, as in 404. The defined period of time, or threshold time, may be any amount of time. For example, the defined period of time may be 1 second, 2 seconds, 5 seconds, or any other amount of time. As discussed above, presented object identifiers may be considered stationary on the display of the device if no input or interaction is received from the user to alter a view presented by the portable device and/or if the same pixels are used to present the object identifiers during the defined period of time.

If it is determined that the presented object identifiers have not been stationary for the defined period of time, the example process 400 returns to block 402 and continues. However, if it is determined that the presented object identifiers have been presented for at least the defined period of time, injection controls corresponding to the presented object identifiers are activated and injection control identifiers corresponding to respective positions of each injection control are presented, as in 406. As discussed above, an injection control may correspond to a portion or segment of a presented object identifier (or the entire object identifier) such that interaction with that portion or segment of the object identifier will indicate a desire by the user to receive additional object identifiers related to that presented object identifier. The injection control identifier may be any visual indicator that is presented to illustrate the portion or segment of the object identifier corresponding to the injection control.

In addition, as discussed above, in other implementations, the injection controls for object identifiers may always be active and the injection control identifiers may only be presented after the defined period of time has elapsed. Alternatively, by disabling the injection controls while the presented object identifiers are moving with respect to the display of the portable device and then activating the injection controls after object identifiers have been presented in a stationary position for a defined period of time may reduce or eliminate inadvertent interaction with an injection control.

After activating the injection controls, a determination is also made as to whether an interaction with one or more of the activated injection controls is received, as in 410. If an interaction with an injection control is not received, the example process 400 returns to block 402 and continues. If an interaction with an injection control is received, information regarding the object identifier corresponding to the interacted with injection control, and a context is sent from the user device to the object management service, as in 411. Information regarding the object identifier may include an identifier or other indicator of the object identifier, referred to herein generally as an object identifier indicator. The context indicates the context in which the object identifier was presented. For example, the context may indicate that the object identifier was presented on the user device as part of a feed of object identifiers of interest to the user, as part of a feed of object identifiers satisfying a search query, etc. In other implementations, the context may not be provided as it may be known to the object management service. In still other implementations, information in addition to or alternative to the context may be provided with the object identifier indicator.

Upon receipt of the object identifier indicator and optionally the context and/or other information, the object management service determines and sends back to the user device additional object identifiers related to the object identifier corresponding to the received object identifier indicator, as in 408. Relationships between an object identifier corresponding to an interacted with injection control (represented by the received object identifier indicator) and additional object identifiers may be maintained in a data store, such as an object identifier relationship data store indicating object identifiers that are related. Object identifiers may be related for one or more of a variety of reasons. For example, two or more object identifiers may be related in response to a user input, if the object identifiers are associated with a same set, based on a type or content of the object represented by the object identifiers, based on annotations associated with each object identifiers, etc. For example, if a first object identifier includes a representation of a wine bottle and a second object identifier includes a representation of a vineyard, the two object identifiers may be related because they both include representations that are wine related.

In some implementations, object identifiers determined to be related to an object identifier corresponding to an interacted with injection control may also be determined based on user preferences known about the user and/or maintained in a user profile corresponding to the user. In such an implementation, an object identifier may be determined to be related to another object identifier if a relationship exists in the object identifier relationship data store and if the object identifier corresponds to a preference of the user. For example, if the user has specified a preference for red wine and the user interacts with an injection control corresponding to an object identifier about wine, related object identifiers will include object identifiers that have a relationship in the object identifier relationship data store and that relate to red wine. In such an instance, object identifiers related to white wine may not be indicated as related object identifiers.

In some implementations, rather than waiting for a user to interact with an activated injection control, the user device may send object identifier indicators for each object identifier for which an injection control is activated and the object management service may determine and send back to the user device additional object identifiers corresponding to those object identifiers. The user device, upon receipt of the additional object identifiers may store those object identifiers in memory so they are available if an interaction with an injection control is received. If the user interacts with an injection control, the additional object identifiers are available for presentation. If the user continues to scroll through the feed of object identifiers, the additional object identifiers may be removed from memory or otherwise invalidated.

In response to receiving the related object identifiers, the position of object identifiers that do not correspond to the interacted with injection control are repositioned in the feed, as in 412. As discussed above with respect to FIGS. 1A-3B, object identifiers of the feed may be repositioned within a feed by moving the object identifiers up or down in the feed so that additional object identifiers related to the object identifier corresponding to the selected injection control may be injected into the feed and presented as part of the feed of object identifiers, as in 414. In some implementations, an animation of the object identifiers being repositioned and injection of the additional object identifiers into the feed so that they are presented as part of the feed and adjacent the object identifier corresponding to the selected injection control may be presented.

Upon insertion and presentation of the additional object identifiers, the example process 400 returns to block 402 and continues.

Figure 5:
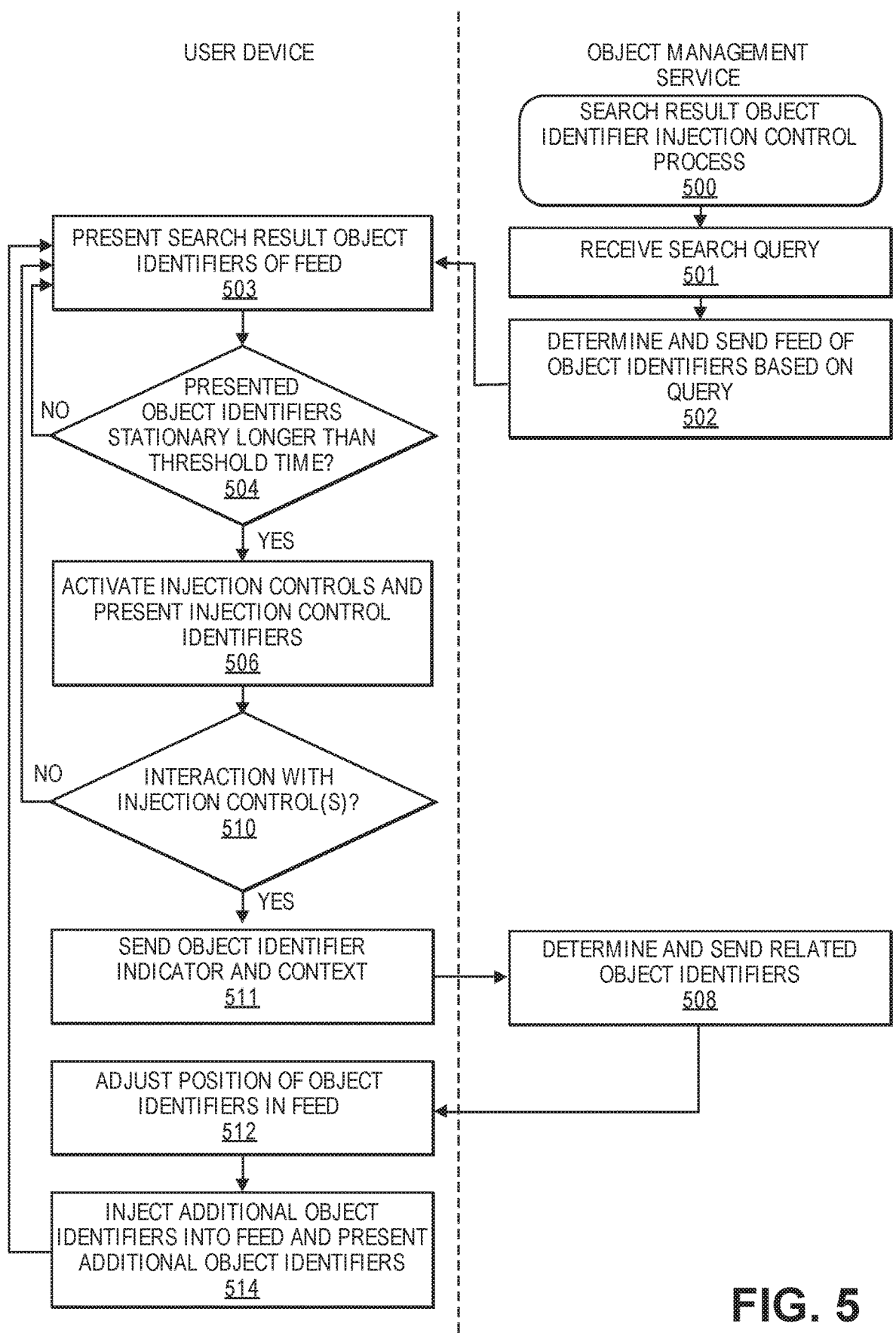
FIG. 5 illustrates an example search result object identifier injection control process, according to described implementations.

FIG. 5 illustrates a flow diagram of an example search results object identifier injection control process 500, according to described implementations. Like FIG. 4, some portions of the example process 500 may be performed by a user device and other portions may be performed by the object management service executing on a remote computing device. In other implementations, different aspects of the example process may be performed, in whole or in part, by other computing components.

The process 500 begins upon receipt by the object management service of a search query, as in 501. The search query may be provided by the user device and may include, for example, a text based search in which one or more terms, words, or other characters are received, a visual search in which one or more images or object identifiers are selected as the search query, or other forms of input that may be used to query the object identifier data store for object identifiers that satisfy the query.

In response to the query, a feed of object identifiers that match the search query are determined and sent to the user device, as in 502. Object identifiers may be determined to match a search query based on, for example, keywords or annotations included in the object identifiers corresponding to a term input for the query, images included in object identifiers having a similarity to images or object identifiers provided as the search query, etc. For example, if a search query includes the term "dog," object identifiers included in the object identifier data store that include the term "dog" in an annotation and/or have been processed using an image processing algorithm to determine that the image of the object identifier includes a representation of a dog may be determined to match the search query and, as a result, be included in the feed of object identifiers for the search query.

Upon receiving a feed of object identifiers that match the search query, one or more of the object identifiers of the feed are presented to the user, as in 503. As discussed above, the feed of object identifiers may be a continuous feed of object identifiers matching the search query that are presented to the user on a display of a portable device such that the user may interact with the feed of object identifiers to view different object identifiers included in the feed. For example, the user may scroll up or down in the feed to view other object identifiers included in the feed.

As the object identifiers of the feed of object identifiers are presented, a determination is made by the user device as to whether the presented object identifiers have been at a stationary position on the display for a defined period of time, also referred to as a threshold time, as in 504. The defined period of time, or threshold time, may be any amount of time. For example, the defined period of time may be 1 second, 2 seconds, 5 seconds, or any other amount of time. As discussed above, presented object identifiers may be considered stationary on the display of the device if no input or interaction is received from the user to alter a view presented by the portable device and/or if the same pixels are used to present the object identifiers during the defined period of time.

If it is determined that the presented object identifiers have not been stationary for the defined period of time, the example process 500 returns to block 502 and continues. However, if it is determined that the presented object identifiers have been presented for at least the defined period of time, injection controls corresponding to the presented object identifiers are activated and injection control identifiers corresponding to respective positions of each injection control are presented, as in 506. As discussed above, an injection control may correspond to a portion or segment of a presented object identifier (or the entire object identifier) such that interaction with that portion or segment of the object identifier will indicate a desire by the user to receive additional object identifiers related to that presented object identifier. The injection control identifier may be any visual indicator that is presented to illustrate the portion or segment of the object identifier corresponding to the injection control.

In addition, as discussed above, in other implementations, the injection controls for object identifiers may always be active and the injection control identifiers may only be presented after the defined period of time has elapsed. Alternatively, by disabling the injection controls while the presented object identifiers are moving with respect to the display of the portable device and then activating the injection controls after object identifiers have been presented in a stationary position for a defined period of time may reduce or eliminate inadvertent interaction with an injection control.

After activating the injection controls, a determination is also made as to whether an interaction with one or more of the activated injection controls is received, as in 510. If an interaction with an injection control is not received, the example process 500 returns to block 502 and continues. If an interaction with an injection control is received, information regarding the object identifier corresponding to the interacted with injection control, and a context is sent from the user device to the object management service, as in 511. Information regarding the object identifier may include an identifier or other indicator of the object identifier. The context indicates the context in which the object identifier was presented. For example, the context may indicate that the object identifier was presented on the user device as part of a feed of object identifiers of interest to the user, as part of a feed of object identifiers satisfying a search query, etc. In other implementations, the context may not be provided as it may be known to the object management service. In still other implementations, information in addition to or alternative to the context may be provided with the object identifier indicator.

Upon receipt of the object identifier indicator and optionally the context and/or other information, the object management service determines and sends back to the user device additional object identifiers corresponding to the received object identifier indicator, as in 508. Related object identifiers may or may not correspond to the search query. For example, relationships between a presented object identifier and additional object identifiers may be maintained in a data store, such as an object identifier relationship data store indicating object identifiers that are related.

In response to receiving the related object identifiers, the position of object identifiers that do not correspond to the interacted with injection control are repositioned in the feed, as in 512. As discussed above with respect to FIGS. 1A-3B, object identifiers of the feed may be repositioned within a feed by moving the object identifiers up or down in the feed so that additional object identifiers related to the object identifier corresponding to the selected injection control may be injected into the feed and presented as part of the feed of object identifiers, as in 514. In some implementations, an animation of the object identifiers being repositioned and injection of the additional object identifiers into the feed so that they are presented as part of the feed and adjacent the object identifier corresponding to the selected injection control may be presented.

Upon insertion and presentation of the additional object identifiers, the example process 500 returns to block 502 and continues.

Figure 6:
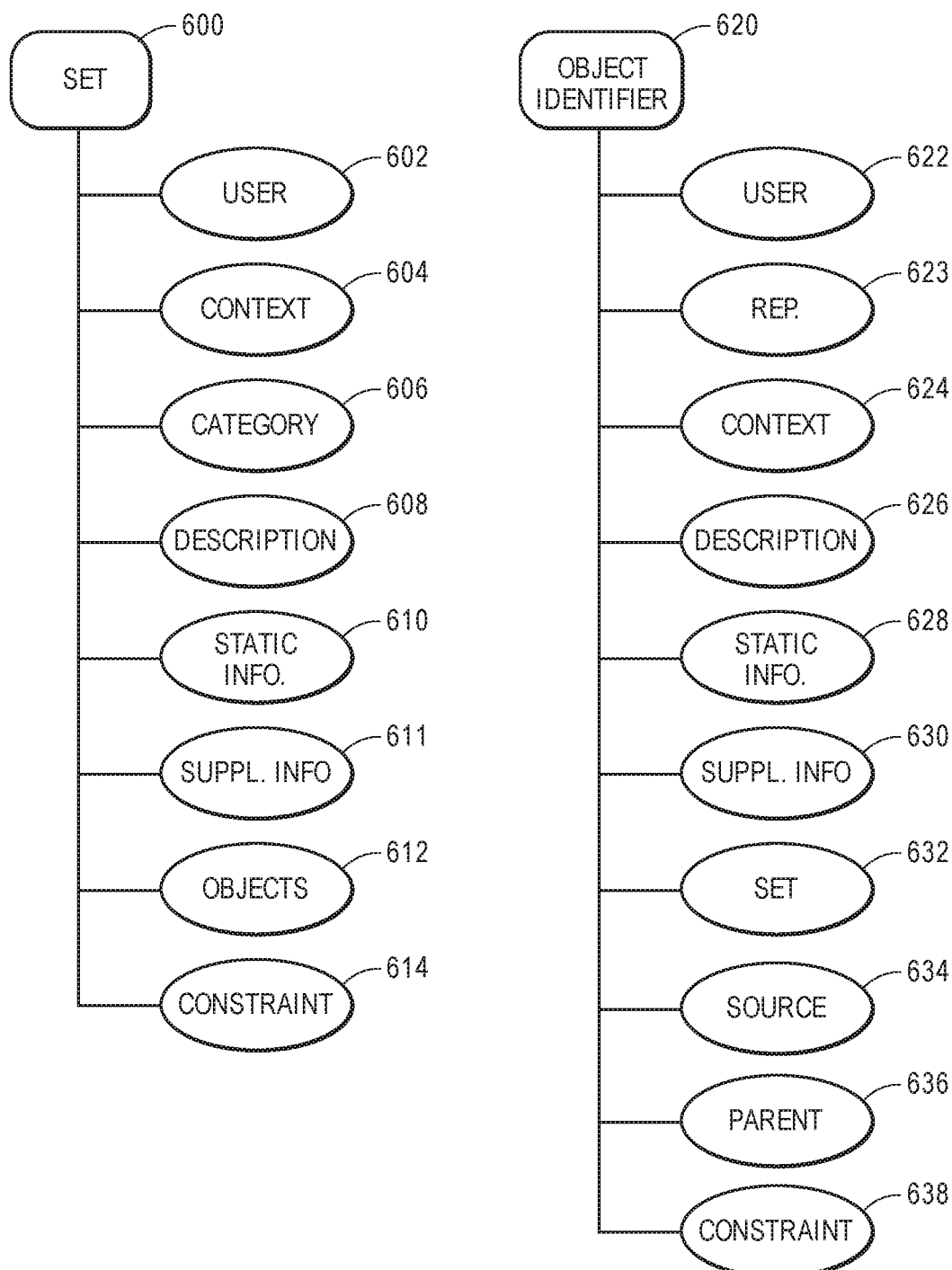
FIG. 6 is a block diagram of an example structure of a set and an object identifier, according to an implementation.

FIG. 6 is a block diagram of an example structure of a set 600 and an object identifier 620, according to an implementation. As discussed above, a set 600 may include an identification of the user 602 that created the set and any users that have been identified as allowed to add object identifiers to the set. In addition, a context 604 as provided by a user or determined by the object management service 921, may be associated with the set 600 along with a user selected category 606. A category 606 may be selected from a list of preexisting categories provided by the object management service 921. For example, a category 606 may be animals, books, arts and entertainment, sports, food and drink, etc., and a user, upon creating a set 600, may select one or more of those categories for association with the set 600. A user may also provide a description 608 providing information about the set 600 from the user's perspective. Static information 610 may also be associated with the set 600. For example, the object management service 921 may automatically incorporate certain information relevant to a set 600 based on the selected category and optionally the provided description 608. Static information 610 may also include information provided by the creator of the set and/or other users of the object management service 921. For example, other users may view, comment and/or otherwise provide feedback with respect to a set. Comments and/or other feedback from the creator and/or other users may be associated with the set 600 and maintained as static information 610.

Supplemental information 611 relevant to the set 600 may also be maintained. Supplemental information for a set may be any form of information or action provided by a source of one or more representations associated with the set, a source of one or more objects associated with a set, or any other external source. For example, if the set is about Hawaii, a weather service (external source) may provide supplemental information in the form of weather in Hawaii that is associated with the set. As object identifiers are added to the set 600 they may be identified as objects 612 associated with the set 600.

Finally, constraints 614 may also be associated with the set 600 and used to control access, modification or other aspects of the set 600. For example, the creator of a set 600 may specify constraints as to who can view the set, add object identifiers to the set, whether users can comment on the set, etc.

In some implementations, an object identifier 620 may include an identification of the user 622 that created the object identifier 620, a user provided description 626 describing the object identifier from the user's perspective, and static information 628. Similar to the set 600, the static information 628 may be included in the object identifier 620 by the object management service 921 based on the selected representation 623 of the object and/or the description provided by the user. For example, if a user has selected a representation 623 of the object that is already known to the object management service, existing information about the representation may be included in the object identifier 620. Other static information about an object identifier 620 may include comments provided by other users of the object management service 921, the creator of the object identifier, etc.

A representation 623 may also be included in the object identifier. The representation may be any element that can be used to represent the object. For example, the representation may be a graphical representation of the object (e.g., image), an audio representation of an object, or any other representation of an object.

In addition to the object management service 921 providing static information 628, in some implementations, supplemental information 630 may also be associated with the object identifier 620. Supplemental information may be any form of information or action provided by a source of the representation, a source of the object, or any other external source. For example, the source of the object may provide information about the object while other external sources may provide actions relevant to the object. For example, if the object is a television, the source of the television may be the manufacturer, such as SONY®, and that source may provide basic information about the object. In this example, the information about the object provided by the manufacturer may include the dimensions, resolution, weight, etc. Other external sources, such as sellers of the television, may provide additional supplemental information that may be associated with the object identifier 620. For example, sellers of the object may provide actions that allow a user viewing the object identifier 620 to initiate a purchase of the object, obtain additional information about the object, obtain information about the external source selling the object, etc.

Returning to FIG. 6, the object identifier 620 may also identify a source 634 from which the representation of the object was obtained, or the source of the object. In addition to providing a source 634, if the object identifier was based upon and created from another existing object identifier, that existing object identifier may be identified in the object identifier 620 as the parent 636 of the object identifier 620. Finally, constraints 638 may also be associated with the object identifier 620 and used to control access, modification or other aspects of the object identifier 620. For example, the creator of an object identifier 620 may specify constraints as to whether the object identifier can be viewed by other users, copied into other sets, whether users can comment on the object identifier, etc.

Figure 7:
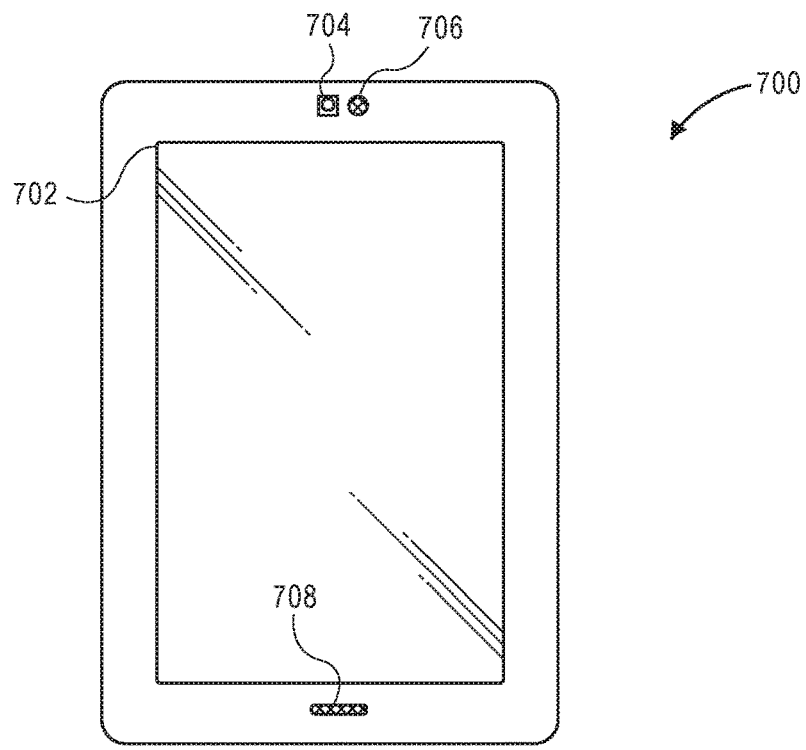
FIG. 7 illustrates an example computing device that can be used in accordance with various implementations.

FIG. 7 illustrates an example portable device 700 that can be used in accordance with various implementations described herein. In this example, the portable device 700 includes a display 702 and optionally at least one input component 704, such as a camera, on a same side of the device as the display 702. The portable device 700 may also include an audio transducer, such as a speaker 706, and optionally a microphone 708. Generally, the portable device 700 may have any form or input/output components that allow a user to interact with the portable device 700. For example, the various input components for enabling user interaction with the device may include a touch-based display 702 (e.g., resistive, capacitive, Interpolating Force-Sensitive Resistance (IFSR)), camera (for gesture tracking, etc.), microphone, global positioning system (GPS), compass or any combination thereof. One or more of these input components may be included on a device or otherwise in communication with the device. Various other input components and combinations of input components can be used as well within the scope of the various implementations as should be apparent in light of the teachings and suggestions contained herein.

Figure 8:
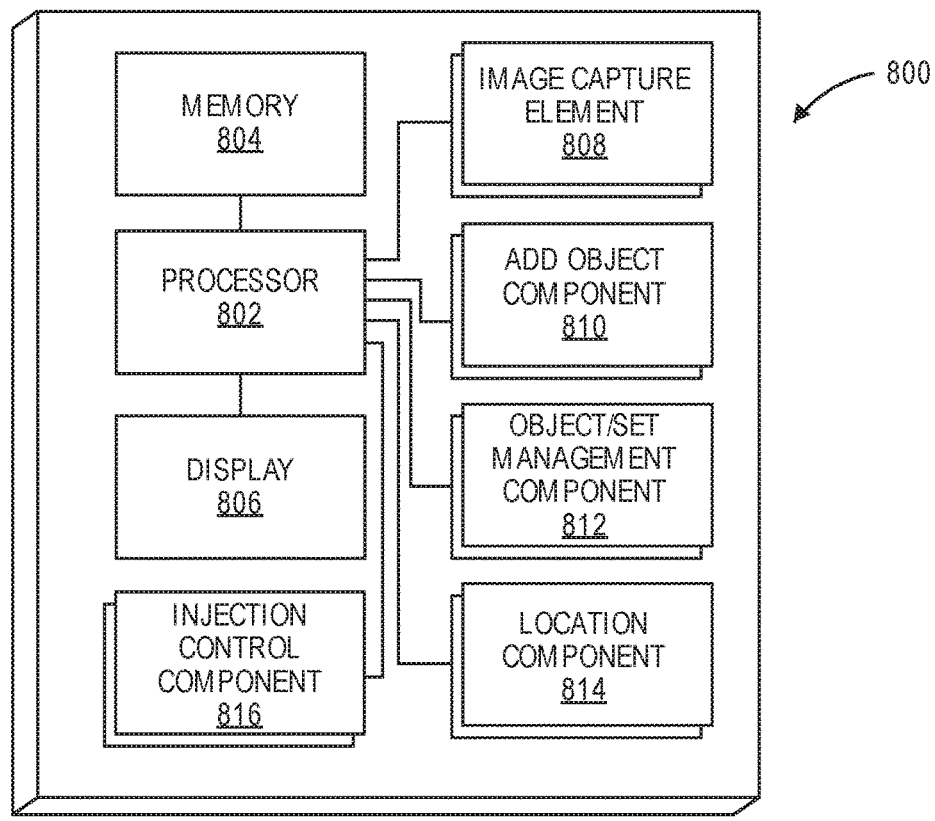
FIG. 8 illustrates an example configuration of components of a computing device, such as that illustrated in FIG. 7.

In order to provide the various functionality described herein, FIG. 8 illustrates an example set of basic components 800 of a portable device, such as the portable device 700 described with respect to FIG. 7 and discussed herein. In this example, the device includes at least one central processor 802 for executing instructions that can be stored in at least one memory device or element 804. As would be apparent to one of ordinary skill in the art, the device can include many types of memory, data storage or computer-readable storage media, such as a first data storage for program instruction for execution by the processor 802. Removable storage memory can be available for sharing information with other devices, etc. The device typically will include some type of display 806, such as a touch-based display, electronic ink (e-ink), organic light emitting diode (OLED) or liquid crystal display (LCD).

The device in many implementations will include at least one image capture element 808, such as one or more cameras that are able to image objects in the vicinity of the device. An image capture element can include, or be based at least in part upon any appropriate technology, such as a CCD or CMOS image capture element having a determined resolution, focal range, viewable area, and capture rate. The device can include at least one add object component 810 for performing the process of creating an object identifier that identifies an object, and/or interacting with the object management service, discussed further below, as part of the process of creating an object identifier that identifies an object. For example, the portable device may be in constant or intermittent communication with the object management service and may exchange information, such as representations, descriptions, source information, etc., with the object management service as part of the process for creating an object identifier for an object.

The device may also include an object/set management component 810 that stores and manages information about existing object identifiers and/or sets created by or otherwise associated with the user of the portable device and/or object identifiers or sets that are presented or available for presentation by the portable device. For example, the object/set management component 810 may maintain object identifiers of a feed and cause the presentation of object identifiers as part of the feed of object identifiers. Storing and maintaining such information on the device provides the ability for a user to interact with and use many of the various implementations discussed herein even in the event the portable device cannot communicate with the object management service.

The device also can include at least one location element 812, such as GPS, NFC location tracking or Wi-Fi location monitoring. Location information obtained by the location element 812 may be used with the various implementations discussed herein to identify the location of the user, source location, object location, and the like and support the creation, modification and/or management of sets and/or object identifiers.

The device may also include an injection control component 816 that controls the activation/deactivation of injection controls corresponding to presented object identifiers and may also control the presentation of injection control identifiers as well as detect interaction with an injection control. In some implementations, the injection control component 816 may also be configured to alter the position, size, and/or interaction with injection controls and/or alter the presentation of injection control identifiers. For example, a user may specify the size and/or location of injection controls for object identifiers, the defined period of time before the injection controls are activated, and/or specify the size, type, and/or visual feedback that is presented as the injection control identifier.

The example portable device may also include at least one additional input device able to receive conventional input from a user. This conventional input can include, for example, a push button, touch pad, touch-based display, wheel, joystick, keyboard, mouse, trackball, keypad or any other such device or element whereby a user can input a command to the device. These I/O devices could be connected by a wireless, infrared, Bluetooth, or other link as well in some implementations.

Figure 9:
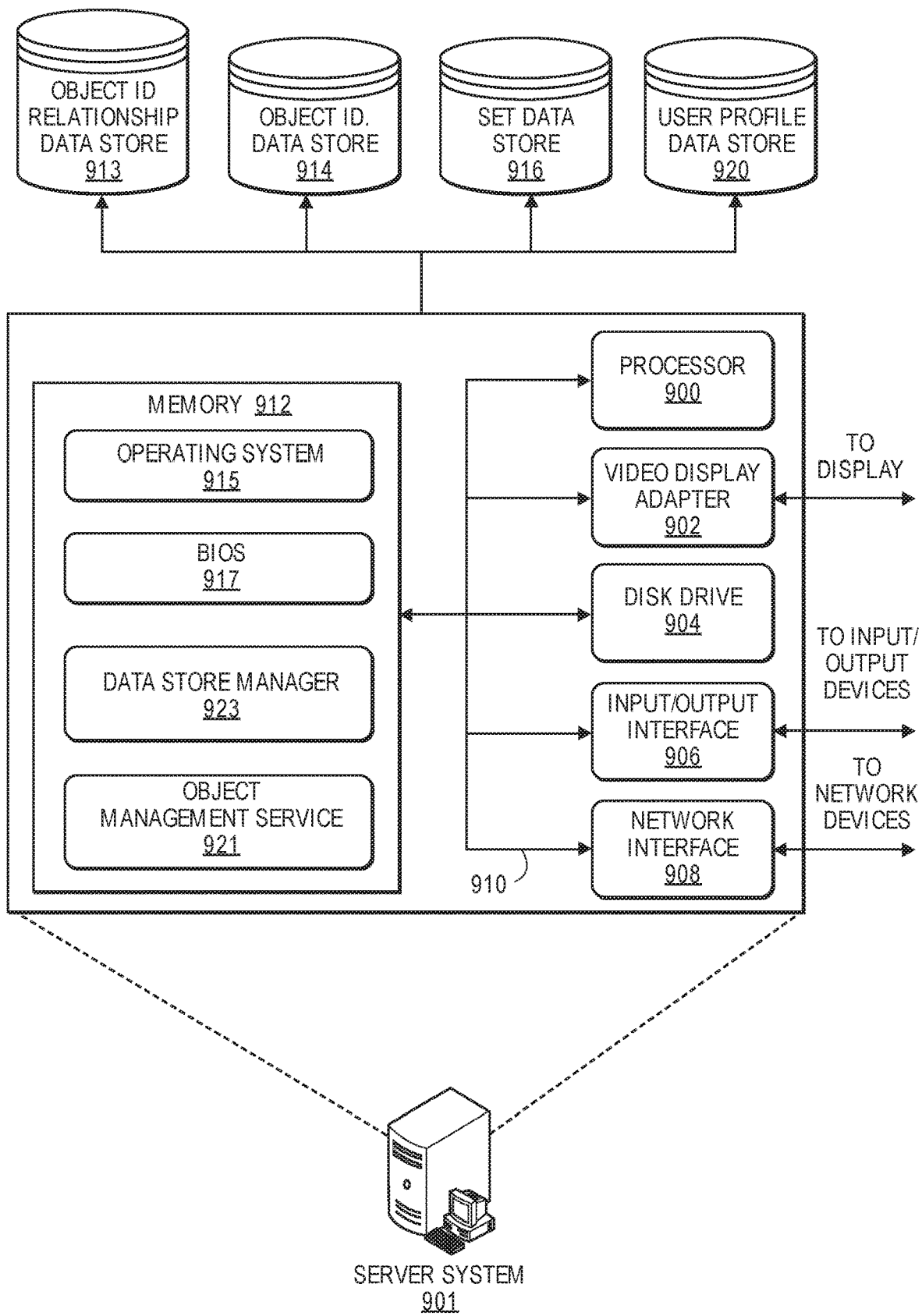
FIG. 9 is a pictorial diagram of an illustrative implementation of a server system that may be used for various implementations.

FIG. 9 is a pictorial diagram of an illustrative implementation of a server system that may be used with implementations described herein. The server system 901 may include a processor 900, such as one or more redundant processors, a video display adapter 902, a disk drive 904, an input/output interface 906, a network interface 908, and a memory 912. The processor 900, the video display adapter 902, the disk drive 904, the input/output interface 906, the network interface 908, and the memory 912 may be communicatively coupled to each other by a communication bus 910.

The video display adapter 902 provides display signals to a local display permitting an operator of the server system 901 to monitor and configure operation of the server system 901. The input/output interface 906 likewise communicates with external input/output devices not shown in FIG. 9, such as a mouse, keyboard, scanner, or other input and output devices that can be operated by an operator of the server system 901. The network interface 908 includes hardware, software, or any combination thereof, to communicate with other computing devices. For example, the network interface 908 may be configured to provide communications between the server system 901 and other computing devices, such as the portable device 700 (FIG. 7).

The memory 912 generally comprises random access memory (RAM), read-only memory (ROM), flash memory, and/or other volatile or permanent memory. The memory 912 is shown storing an operating system 915 for controlling the operation of the server system 901. A binary input/output system (BIOS) 917 for controlling the low-level operation of the server system 901 is also stored in the memory 912.

The memory 912 additionally stores program code and data for providing network services that allow portable devices 700 (FIG. 7) to exchange information, object identifiers, and data files with the server system 901 and/or the object management service 921. The data store manager application 923 facilitates data exchange and mapping between the object identifier relationship data store 913, the object identifier data store 914, the set data store 916, and/or the user profile data store 920, and/or portable devices, such as the portable devices discussed above.

As used herein, the term "data store" refers to any device or combination of devices capable of storing, accessing and retrieving data, which may include any combination and number of data servers, databases, data storage devices and data storage media, in any standard, distributed or clustered environment. The server system 901 can include any appropriate hardware and software for integrating with the data stores 913, 914, 916, and 920 as needed to execute aspects of one or more applications for a portable device and/or the object management service 921. The server system 901 provides access control services in cooperation with the data stores 913, 914, 916, and 920 and is able to generate content such as text, graphics, audio, video and/or object identifiers or sets, related information (e.g., representations, context, descriptions, mappings, analytics about user interfaces), etc., to be transferred to portable devices to support the implementations discussed herein.

The data stores 913, 914, 916, and 920 can include several separate data tables, databases or other data storage mechanisms and media for storing data relating to a particular aspect. For example, the data stores 913, 914, 916, and 920 illustrated include mechanisms for storing content, user information, mappings, representations, object identifiers, and user profiles which can be used to generate and deliver object identifiers and/or feeds of object identifiers to portable devices and control actions to be performed.

It should be understood that there can be many other aspects that may be stored in the data stores 913, 914, 916, and 920, such as access rights information, which can be stored in any of the above listed mechanisms as appropriate or in additional mechanisms of any of the data stores 913, 914, 916, and 920. The data stores 913, 914, 916, and 920 are operable, through logic associated therewith, to receive instructions from the server system 901 and obtain, update or otherwise process data in response thereto.

The memory 912 may also include the object management service 921, discussed above. The object management service 921 may be executable by the processor 900 to implement one or more of the functions of the server system 901. In one implementation, the object management service 921 may represent instructions embodied in one or more software programs stored in the memory 912. In another implementation, the object management service 921 can represent hardware, software instructions, or a combination thereof.

The server system 901, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction in FIG. 9 should be taken as being illustrative in nature and not limiting to the scope of the disclosure.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the art should recognize that components and process steps described herein may be interchangeable with other components or steps, or combinations of components or steps, and still achieve the benefits and advantages of the present disclosure. Moreover, it should be apparent to one skilled in the art that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented in firmware or hardware.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A computer implemented method, comprising:
   determining, based at least in part on a user profile, a first set of object identifiers to present to a user associated with the user profile, the first set of object identifiers comprising at least a first object identifier and a second object identifier;
   causing a presentation of the first set of object identifiers on a display of a device such that the first object identifier is presented adjacent the second object identifier on the display;
   upon determining that the presentation of the first object identifier and the second object identifier have been presented on the display for a defined period of time:
      causing a presentation of a first injection control corresponding to at least a portion of the first object identifier over the at least a portion of the first object identifier; and
      causing a presentation of a second injection control corresponding to at least a portion of the second object identifier over the at least a portion of the second object identifier;
   receiving an interaction with the second injection control; and
   in response to receiving the interaction:
   determining a third object identifier corresponding to the second object identifier, wherein the third object identifier is not a member of the first set of object identifiers;
   inserting the third object identifier into the first set of object identifiers such that the third object identifier is a member of the first set of object identifiers; and
   altering the presentation of the first set of object identifiers by causing the presentation of the third object identifier to be displayed between the first object identifier and the second object identifier such that the first object identifier and the second object identifier are no longer adjacent.

2. The method of claim 1, further comprising:
causing a presentation of a third injection control corresponding to at least a portion of the third object identifier over the at least a portion of the third object identifier.

3. The method of claim 1, wherein:
the first set of object identifiers comprise object identifiers determined to be of potential interest to the user, and further comprise a continuous feed of object identifiers that may be presented to the user on the display of the device.

4. The method of claim 3, further comprising:
determining a fourth object identifier corresponding to the second object identifier; and
inserting the fourth object identifier in the first set of object identifiers.

5. The method of claim 4, further comprising:
receiving a second input to alter the presentation of the first set of object identifiers on the display of the device; and
in response to receiving the second input, causing a presentation of the fourth object identifier such that the fourth object identifier is intermixed with object identifiers of the first set of object identifiers between the first object identifier and the second object identifier.

6. The method of claim 1, wherein:
the second object identifier is representative of an item of a first type; and
the third object identifier is representative of a respective item of the first type.

7. A computing system, comprising:
one or more processors; and
a memory storing program instructions that when executed by the one or more processors cause the one or more processors to at least:
   cause a first presentation on a display of a device, the first presentation including a first set of object identifiers, wherein a first object identifier of the first set of object identifiers is presented vertically adjacent to the presentation of a second object identifier of the first set of object identifiers on the display;
   after the presentation of the first object identifier and the second object identifier on the display for a determined period of time, causing a presentation of a first injection control with at least a portion of the first object identifier and causing a presentation of a second injection control with at least a portion of the second object identifier, wherein each respective injection control corresponds to at least a portion of the object identifier;

receive an interaction with a first injection control corresponding to the first object identifier of the first set of object identifiers;

determine a plurality of object identifiers corresponding to the first object identifier not included in the first set of object identifiers; and alter the presentation on the display of the device such that the altered presentation includes a third object identifier of the plurality of object identifiers corresponding to the first object identifier presented between the first object identifier of the first set of object identifiers and the second object identifier of the first set of object identifiers, and such that the first object identifier and the second object identifier are not presented vertically adjacent on the display of the device.

8. The computing system of claim 7, the instructions further causing the one or more processors to at least:

further alter the presentation on the display of the device by inserting a fourth object identifier of the plurality of object identifiers between the presentation of other object identifiers of the first set of object identifiers on the display of the device.

9. The computing system of claim 7, the instructions further causing the one or more processors to at least:

after the presentation of the third object identifier between the first object identifier and the second object identifier on the display for a determined period of time, enable, for each of the at least a portion of the plurality of object identifiers presented on the display, a respective injection control, wherein the respective injection control corresponds to at least a portion of the object identifier.

10. The computing system of claim 9, wherein each of the respective injection controls for each of the object identifiers presented on the display is selectable to receive a presentation of object identifiers related to the object identifier corresponding to the selected injection control.

11. The computing system of claim 7, wherein:

enablement for each of the first set of object identifiers the respective injection control is performed based at least in part in response to a determination that each of the first set of object identifiers have been presented on the display for a defined period of time.

12. The computing system of claim 7, the instructions further causing the one or more processors to at least:

present, concurrent with each of the first set of object identifiers, a respective injection control identifier corresponding to at least a portion of the object identifier.

13. The computing system of claim 12, wherein at least one of the respective injection control identifiers is presented as a circular object in a corner of the corresponding object identifier.

14. The computing system of claim 12, the instructions further causing the one or more processors to at least:

in response to receipt of the interaction with the first injection control, visually alter a presentation of a first injection control identifier to provide a visual feedback that the interaction has been received.

15. The computing system of claim 7, the instructions further causing the one or more processors to at least:

subsequent to altering the presentation on the display of the device, enabling a scrolling of the altered presentation in at least one of a vertical direction or a horizontal direction to view additional object identifiers.

16. The computing system of claim 15, wherein the additional object identifiers include object identifiers of the first set of object identifiers, object identifiers of the plurality of object identifiers, or both object identifiers of the first set of object identifiers and object identifiers of the plurality of object identifiers.

17. The computing system of claim 7, the instructions further causing the one or more processors to at least:

in response to the interaction with the first injection control being received, present on the display a selection control, wherein the selection control may be interacted with to perform at least one of save an instance of the first object identifier, or receive a presentation of the at least a portion of the plurality of object identifiers.

18. The computing system of claim 7, wherein different object identifiers of the at least a portion of the plurality of object identifiers are presented both above and below the first object identifier.

19. A computer implemented method, comprising:

determining a user;

determining a first plurality of object identifiers to present to the user as a feed of object identifiers, wherein the feed of object identifiers may be interacted with by the user to view different object identifiers of the first plurality of object identifiers;

presenting on a display a first portion of the feed of object identifiers, wherein a first object identifier of the feed of object identifiers and a second object identifier of the feed of object identifiers are presented immediately adjacent to each other;

after a determined amount of time from presenting the first portion of the feed of object identifiers, causing the presentation on the display of an injection control with a portion of the first object identifier;

receiving an interaction with the injection control;

determining a second plurality of object identifiers related to the first object identifier not already included in the feed of object identifiers;

including the second plurality of object identifiers in the feed of object identifiers; and modifying the presentation on the display such that at least one of the second plurality of object identifiers is presented between the first object identifier and the second object identifier of the first plurality of object identifiers such that the first object identifier and the second object identifier are not presented immediately adjacent.

20. The computer implemented method of claim 19, further comprising:

determining a user profile; and wherein the first plurality of object identifiers is determined based at least in part on the user profile.

21. The computer implemented method of claim 19, further comprising:

receiving a search query; and wherein the first plurality of object identifiers is determined based at least in part on the search query.

22. The computer implemented method of claim 19, wherein:

the second plurality of object identifiers is determined based at least in part on the first object identifier and a user profile.

* * * * *